United States Patent
Hunt et al.

(10) Patent No.: US 12,238,413 B2
(45) Date of Patent: Feb. 25, 2025

(54) LOW-POWER ALWAYS-ON IMAGE SENSOR AND PATTERN RECOGNIZER

(71) Applicant: Telefonaktiebolaget LM Ericsson (publ), Stockholm (SE)

(72) Inventors: Alexander Hunt, Tygelsjö (SE); Andreas Kristensson, Södra Sandby (SE); Fredrik Dahlgren, Lund (SE); Magnus Olsson, Klagshamn (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 52 days.

(21) Appl. No.: 18/033,844

(22) PCT Filed: Nov. 19, 2020

(86) PCT No.: PCT/EP2020/082734
§ 371 (c)(1),
(2) Date: Apr. 26, 2023

(87) PCT Pub. No.: WO2022/106008
PCT Pub. Date: May 27, 2022

(65) Prior Publication Data
US 2023/0412917 A1    Dec. 21, 2023

(51) Int. Cl.
*H04N 23/65* (2023.01)
*H04N 23/611* (2023.01)
(Continued)

(52) U.S. Cl.
CPC ......... *H04N 23/651* (2023.01); *H04N 23/611* (2023.01); *H04N 25/77* (2023.01)

(58) Field of Classification Search
CPC .. H04N 23/651; H04N 23/611; H04N 23/617; H04N 25/77; H04N 25/00;
(Continued)

(56) References Cited

U.S. PATENT DOCUMENTS 11,605,240 B1 * 3/2023 Wei .................... G06V 40/1359
2011/0134251 A1   6/2011 Kim et al.
(Continued)

FOREIGN PATENT DOCUMENTS

EP        3502954 A1   6/2019
WO    2021249649 A1  12/2021

OTHER PUBLICATIONS

PCT International Search Report, mailed Jul. 22, 2021, in connection with International Application No. PCT/EP2020/082734, all pages.
(Continued)

*Primary Examiner* — Marly S Camargo
(74) *Attorney, Agent, or Firm* — Leffler Intellectual Property Law, PLLC; Kenneth B. Leffler

(57) ABSTRACT

An optical sensor module has a controller, a sensor array, present state decision circuitry, and a pattern recognizer. The sensor array comprises a plurality of CMOS sensor pixels, wherein the sensor array is configured to supply one of a plurality of analog sensor signals at each of a sequence of sample times, wherein at each of the sample times, the one of the plurality of analog sensor signals is derived from one or more of the plurality of CMOS sensor pixels. The present state decision circuitry is configured to compare the one of the plurality of the analog sensor signals with a respective controller-selected reference voltage and to generate therefrom a respective single state decision signal. The pattern recognizer is configured to assert a pattern recognition signal whenever a plurality of sequentially generated single state decision signals matches a currently active one of a set of one or more reference sequences of single state decision signals. The controller is configured to assert a host system trigger signal when the pattern recognition signal is asserted a predefined number of times in sequence.

20 Claims, 20 Drawing Sheets

(51) Int. Cl.
  *H04N 25/42*  (2023.01)
  *H04N 25/47*  (2023.01)
  *H04N 25/702*  (2023.01)
  *H04N 25/707*  (2023.01)
  *H04N 25/77*  (2023.01)

(58) Field of Classification Search
  CPC ...... H04N 25/42; H04N 25/47; H04N 25/702; H04N 25/707
  See application file for complete search history.

(56) References Cited

U.S. PATENT DOCUMENTS

| | | |
|---|---|---|
| 2013/0108107 A1 | 5/2013 | Kang et al. |
| 2014/0009648 A1 | 1/2014 | Kim et al. |
| 2016/0094814 A1 | 3/2016 | Gousev et al. |
| 2019/0087690 A1 | 3/2019 | Srivastava |
| 2021/0185264 A1* | 6/2021 | Wong .................... H04N 25/78 |
| 2021/0337097 A1 | 10/2021 | Hunt et al. |
| 2022/0116565 A1* | 4/2022 | Tsai ....................... H04N 25/77 |
| 2023/0025549 A1* | 1/2023 | Puchades ............... H04N 25/74 |

OTHER PUBLICATIONS

PCT Written Opinion, mailed Jul. 22, 2021, in connection with International Application No. PCT/EP2020/082734, all pages.
Posch, C. et al., "An Asynchronous Time-based Image Sensor", Circuits and Systems, 2008, IEEE International Symposium, Piscataway, NJ, USA, May 18, 2008, pp. 2130-2133.
Lichtsteiner, P. et al., "A 128x 128 120 dB 15 µs latency asynchronous temporal contrast vision sensor", IEEE Journal of Solid State Circuits, vol. 43, No. 2, Feb. 2008, 13 pages.
Tedaldi, D. et al., "Feature Detection and Tracking with the Dynamic and Active-pixel Vision Sensor (DAVIS)", Downloaded on Sep. 1, 2020 at 06:40:23 UTC from IEEE Xplore, 7 pages.
Kumagai, O. et al., "A 1/4-inch 3.9Mpixel Low-Power Event-Driven Back-Illuminated Stacked CMOS Image Sensor", ISSCC 2018, Session 5, Image Sensors, 5.4, 2018 IEEE International Solid-State Circuits Conference, 3 pages.
Choo, K.D. et al., "Energy-Efficient Low-Noise CMOS Image Sensor with Capacitor Array-Assisted Charge-Injection SAR ADC for Motion-Triggered Low-Power IoT Applications", ISSCC 2019, Session 5, Image Sensors, 5.2, 2019 IEEE International Solid-State Circuits Conference, 3 pages.
Fossum, E.R. et al., "A 37x28mm 2600k-Pixel CMOS APS Dental X-Ray Camera-on-a-Chip with Self-Triggered Readout", ISSCC98, Session 11, Image Sensors, Paper FA 11.3, Downloaded on Sep. 1, 2020 at 07:20:36 UTC from IEEE Xplore, 2 pages.
Delbruckl, T., "Neuromorphic Vision Sensing and Processing", 2016 IEEE, Downloaded on Sep. 1, 2020 at 06:30:29 UTC from IEEE Xplore, 8 pages.
Neftci, E. et al., "State-dependent sensory processing in networks of VLSI spiking neurons", 2010 IEEE, Downloaded on Sep. 1, 2020 at 06:33:45 UTC from IEEE Xplore, 4 pages.
PCT International Search Report, mailed Mar. 1, 2021, in connection with International Application No. PCT/EP2020/066236, all pages.
PCT Written Opinion, mailed Mar. 1, 2021, in connection with International Application No. PCT/EP2020/066236, all pages.

* cited by examiner

LOW-POWER ALWAYS-ON IMAGE SENSOR AND PATTERN RECOGNIZER

BACKGROUND

The present invention relates to technology for detecting and sensing images of objects (including living and inanimate), more particularly to technology that enables low-power, always-on image sensing operation.

A typical Complementary Metal Oxide Semiconductor (CMOS) camera sensor has a certain resolution and operates in a synchronous fashion in which each collection of sensor data is read out and transferred to a host circuit at a certain frame rate. The analysis of the data (e.g., object detection) is then typically handled in the host processing subsystem, either in a central processing unit (CPU), a graphics processing unit (GPU), or in a neural accelerator or neural processing unit (NPU). This leads to high power consumption and is not feasible for a device that needs to have such functionality always on while at the same time being battery-operated. There are different approaches known for how to reduce the power consumption.

One example involves having only some parts of the sensor active, while others remain inactive. Such an approach is described in U.S. patent application Ser. No. 16/860,248, which is hereby incorporated herein by reference in its entirety.

In another example, described in International Application Number PCT/EP2020/066236, a first level of image analysis takes place with low power consumption in the sensor itself, and a deeper analysis in the host processor is activated only when a positive identification (but at a lower confidence level) is made at the first level of analysis.

There are also strategies proposed for optimizing activity detection, and these typically trigger on any lighting change and/or activity. Such strategies are described in E. R. Fossum et al., "FA 11.3: A 37×28 mm² 600 k-Pixel CMOS APS Dental X-Ray Camera-on-a-Chip with Self-Triggered Readout", 1998 IEEE International Solid-State Circuits Conference (ISSCC98), Feb. 6, 1998, pp. 172-173

Posch et al., "An Asynchronous Time-based Image Sensor", in Proc. of the 2008 IEEE International Symposium on Circuits and Systems, May 18-21, 2008, pp. 2130-2133

Oichi Kumagai et al., "A ¼-inch 3.9Mpixel Low-Power Event-Driven Back-Illuminated Stacked CMOS Image Sensor, 2018 IEEE International Solid-State Circuits Conference (ISSCC 2018)/SESSION 5/IMAGE SENSORS/5.4 Feb. 12, 2018, pp. 86-88.

Kyojin D. Choo et al. "Energy-Efficient Low-Noise CMOS Image Sensor with Capacitor Array-Assisted Charge-Injection "SARADC for Motion-Triggered Low-Power IoT Applications, 2019 IEEE International Solid-State Circuits Conference (ISSCC 2019)/SESSION 5/IMAGE SENSORS/5.2, Feb. 17-21, 2019, pp. 96-98

Tedaldi et al., "Feature Detection and Tracking with the dynamic and Active-pixel Vision Sensor (DAVIS)", Proc. of 2016 Second International Conference on Event-based Control, Communication, and Signal Processing (EBCCSP), Jun. 13-15, 2016

Neftci et al., "State-dependent sensory processing in networks of VLSI spiking neurons", in IEEE International Symposium on Circuits and Systems, May 30-Jun. 2, 2010, pp. 2789-2792.

Tobi Delbruck, "Neuromorphic Vision Sensing and Processing", European Solid-State Device Research Conf. & European Solid-State Circuits Conf. Proceedings, Lausanne, Switzerland 2016, pp. 7-14.

A Dynamic Vision Sensor (DVS), also known as an event camera, a neuromorphic camera or a silicon retina, is described in P. Lichtsteiner et al., "A 128×128 120 dB 15 µs latency asynchronous temporal contrast vision sensor", IEEE Journal of Solid State Circuits 2008, Feb. 2, 2008, pp. 566-576. Unlike a conventional CMOS sensor, which has a specific shutter speed, a DVS triggers asynchronously based on local changes in the brightness of the sensed light. The temporal framerate can be up to 1,000,000 frames per second in state-of-the-art dynamic vision sensors. Other benefits are that its dynamic range of 120 dB is superior to that of other sensors and it does not suffer from motion blur or over/under exposure.

FIG. 1A is a schematic diagram of a DVS sensor 100 as disclosed in the above-referenced Lichtsteiner document. The design comprises a fast-logarithmic photoreceptor circuit 101 coupled to a differencing circuit 103 that amplifies changes with high precision. An output of the differencing circuit 103 is supplied to a two-transistor comparator circuit 105. The indicated inverters are symbols for single-ended inverting amplifiers.

The DC mismatch is removed by balancing the output of the differencing circuit to a reset level after the generation of an event. The gain of the change amplification is determined by the well-matched capacitor ratio $C_1/C_2$. The effect of comparator mismatch is reduced by the precise gain of the differencing circuit. The principle of operation of the DVS sensor 100 is depicted in FIG. 1B.

The discussion will now focus on technology in which always-on optical sensing devices are employed. To illustrate one example, FIG. 2A is a block diagram of a low-power object detection/identification system 200 for authorizing performance of a device action. As non-limiting examples, such actions include:
  opening an associated device;
  closing an associated device;
  locking an associated device;
  unlocking an associated device;
  activating an associated device;
  deactivating an associated device;
  starting an associated device;
  stopping an associated device.

In each instance, the associated device is in some way associated with the system 200. There are many types of such associated devices and a complete list is beyond the scope of this description. Non-limiting examples include vehicle locking mechanisms (e.g., vehicle doors, vehicle engines); home locking systems; workplace locking systems; workplace entry authorization systems; secure area authorization systems; consumer appliance (including electronic device) start and stop functions; consumer device (including electronic device) activation/deactivation functions.

In one class of embodiments, extended reality (XR) glasses with an image sensor can be employed as a sensing device, and the system 200 configured to recognize when a particular user and/or object is within a line of sight of the XR glasses. It will further be recognized that opening/activating locked items or devices is but one example out of many possible examples and is for purposes of illustration. As mentioned before, other types of actions can be performed when the system 200 recognizes that a particular object or person is present, and all are contemplated to be within the scope of inventive embodiments.

The system 200 comprises a camera module 201 that can include a standard Red Green Blue (RGB) Camera Image Sensor (CIS). In alternative embodiments, cameras with different setups of color filters can instead be used if the use case is specific and only needs a specific set of colors. In yet other alternative embodiments, the camera module 201 can employ a monochrome camera using only one color or no color filter. In that case the threshold in the system (discussed later) would be a gradient of the specific color.

The camera module 201 is coupled to a host system 202 that includes an Image Signal Processor (ISP) 203 that controls the camera module 201 down to subsets of its sensing capability. These subsets are herein called "sensing structures" and can be different in different embodiments. As non-limiting examples, a "sensing structure" can be any of the following:
- an individual pixel element
- a row of pixel elements
- a column of pixel elements
- any arbitrary set of pixel elements selected from among all of the CIS's pixel elements.

It will be observed that, since a pixel can itself be associated with one of a number of different color filters, a sensing structure can also be associated with a particular color or set of colors.

The ISP 203 that controls the camera module 201 is, in some embodiments, custom made to have specific characteristics for a specific use case.

The host system 202 further includes an analyzer 205 that controls threshold levels that are used when deciding whether a sensed image sufficiently matches a given model. The analyzer 205 also decides what power level the system 200 should operate in.

The host system 202 also includes a central processing unit (CPU) 207 for general-purpose calculations.

The exemplary host system 202 also includes a Graphics Processing Unit (GPU)/Neural Processing Unit (NPU) 209 that is configured to run a neural network for detection and identification of sensed image features and compares these with one or more models of authorized objects/users. In addition, or as an alternative, identification can be accomplished by running state-of-the-art algorithms that are known to those of ordinary skill in the art.

The exemplary host system 202 also includes a memory 211 for storing things such as, but not limited to, neural network weights, images, settings for hardware, and other needed software features.

There exist applications in which power savings are achieved by performing a device authorization/activation process in stages, with a lowest-power stage being performed by a camera module 201 configured such as in the exemplary embodiment illustrated in FIG. 2B. The camera module 201 comprises a sensor array 251 comprising a plurality of sensing structures that are configurable as will be discussed further with reference to FIG. 4. the camera module 201 further comprises a control unit 253 for controlling the various components of the camera module 201 in a way that conforms with the various actions described herein.

In one respect, the camera module 201 is able to make an initial conclusion whether an object or person being presented to the sensor module 251 is one of one or more previously authorized objects/persons, and to facilitate this function the camera module 201 includes a register 255 for users/objects. As will be discussed further below, recognition of an object/person includes detecting whether a sufficient number of activated sensing structures are being triggered by the object/person being presented, and this means comparing the number of triggered sensing structures to a threshold. It is a purpose of the register 255 for users/objects to store settings for all of the objects/users that are available in a given model. There may be one or more than one such object/user.

The initial conclusion made by the camera module 201 should be understood as being a sufficiently close match (within a defined threshold) between the results of the sensed data and the data stored in the register 255 per user/object or version of user/object, and the like. The initial conclusion is not made with 100% certainty. But finding an initial match provides sufficient confidence to warrant engaging a higher power stage of analysis that can be used to further enhance the detection and security of the detection with additional sensors or pixels to give higher resolution and the like. By forming an initial conclusion as presented herein, the system is able to expend only minimal energy in order to avoid having non-matching conditions constantly wake up the higher power system. The ratio of negative detections will likely always be much higher than positive results, thus resulting in significant power savings.

In another respect, the camera module 201 is able to detect when no object/user is being presented to the sensor module 251 and to remain in a very low power state under such circumstances, and then to be able to revert to a more active state when something (object/person) is then presented to the sensor module 251. As will be described further below, this function involves tracking whether the sensor module 251 presently detects an image corresponding only to an image of an environmental background (i.e., an image without an object or person being presented to the sensor module 251). So long as only background is detected, the camera module 201 can remain in the very low power state. If a sufficient enough change to the scanned image is detected, the more active state is entered. To facilitate this purpose, the camera module 201 further includes a register 257 for a background image. It is a purpose of the register 257 for background to store settings for a background that is available in a given model.

FIG. 3 is a schematic/state diagram illustrating the concept of a multi-stage authorization/activation process.

Processing effort begins at a minimal level, depicted as the smallest circle in the left-most position in the diagram, which represents a lowest-power processing state 301. Embodiments consistent with the invention, such as but not limited to the exemplary system 200 of FIG. 2, perform the processing of at least state 301. A baseline model selects a first number of sensing structures of the camera image sensor 251, with the number being less than a total number of sensing structures of the camera image sensor 251. The baseline model is configured to detect a very small number of key image features that would be expected to be found in an image of an authorized object/user, and the first number of sensing structures is selected to be able to detect this small number of key image features.

If the features are not found in the sensed image ("Fail") then further testing, and its consequent greater expenditure of energy, is avoided.

But if the features are found from this sensing ("Pass"), authorization has passed this first stage of testing, and testing moves on to a next state 303 in which a larger number, but depending on embodiment perhaps still not the total number, of sensing structures are activated to detect a match between a sensed image and a model, this time at a higher level of granularity. A failure to match at this level can cause the processing to revert to the initial lowest-power state 301. But a "pass" allows still further testing, and further power to be expended, to ensure that the match is accurate.

The number of stages performed before a final conclusion is reached is implementation dependent. In the non-limiting example of FIG. 3, four states 301, 303, 305, and 307 are shown. But in other embodiments there could be more or fewer states, each associated with a different amount of processing effort to detect whether a sensed image matches a model of an authorized object/user. An advantage of this multi-stage testing arrangement is that, at the conclusion of processing, the system is able to detect, with as little energy consumption as possible, whether a known object/user has been identified, and this reduction in energy consumption enables the system to employ an always-on camera.

To illustrate the power consumption aspect, consider an example shown in FIG. 4 in which an 8 megapixel (MP) camera having an array 401 of 3264×2448 pixel elements consuming about 100 mW is used as the camera module 201. For purposes of this example, it is assumed that each pixel consumes the same amount of energy. Assuming one color and one row we get (only half of the pixels in a row have one color) 1632/8000000*100→0.02 mW per row→20 uW per row and color. The sensor usually has 10-14 bit raw sensor bit depth, but this could be quantized to minimize the power consumption. It could also be that the A/D converter in the camera in low power mode could be one bit and it will be the trigger signal itself.

It is advantageous to have the lowest level of power handled in the camera module 201 itself. Self-contained hardware embodiments of the camera module 201 can be configured for this purpose in order to enable a low-power, always-on embodiment. Based on the baseline signature a few lines of the CIS 251 will be active. For example, suppose a user has a green shirt and blue trousers at the time of using the system 200. The system 200 adds these important colors to the model during a model updating phase of processing. When entering the lowest power level the system, the camera module 201 is activated accordingly. In this case with the green shirt and blue trousers; green pixels in a few rows are activated at the top of the CIS 251 (above the center of the vertical field of view for example) and blue pixels are activated in the bottom of the CIS 251 (below the center of the vertical field of view for example). The pixel rows that are active indicate a triggering event once a threshold of pixel value is found. The algorithm used to analyze the selected set of pixels is also robust enough to manage a range of values that can identify a certain pattern but with alignment towards the sensor somewhat askew. In the example it can be one of many situations affecting the intensity of certain colors for example slightly lower, to the side or further away. This could be done on sensor level of the camera module 201 or in the ISP 203 running in low power mode.

It will be noted that the use of the colors green and blue in the above example are for purposes of illustration only, and are non-limiting. Any colors (e.g., purple, gold, silver) could have been used in the example, and the aspects illustrated in the exemplary embodiment would still hold, with pixel rows being selected for activation based on the extent to which they sense color components of the object's color(s).

In the example of FIG. 4, a "sensing structure" is considered to be a row of pixels, and four of these are shown in an activated state: a first sensing structure 403 for detecting blue; a second sensing structure 405, also for detecting blue; a third sensing structure 407 for detecting green; and a fourth sensing structure 409, also for detecting green. Again, these selections are for purposes of illustration only; there is no particular significance to the number of illustrated sensing structures, their locations or orientations within the array 401, the particular colors being sensed, or even the fact that pixels are selected to form a contiguous portion (e.g., a row) of the array 401. To highlight this point, the schematically depicted sensing structure 420 is included in the figure to represent sensing structures in the "general case".

Remaining sensing structures illustrated in FIG. 4 are, in the illustration, inactive.

If an image obtained from the activated sensing structures 403, 405, 407, 409 passes a first round of testing against a model, then a next level of identification could, for purposes of example, be that ⅔ of the Vertical Field of View (VFOV) starting at the top looks at green and ⅔ of the VFOV starting from the bottom looks at blue. The question being asked could be, for example, is it possible to identify a green shirt and blue trousers? If yes and the image obtained from the further activated sensing structures sufficiently matches this level's model, then processing moves on to a next power level; otherwise processing reverts back to an adaptive identification sleep mode. The identification processing can be performed by the neural processing unit 209 and the analyzer 205 can be used to decide whether testing at the next power level should be activated or instead whether the current (higher) power level should be deactivated based on the result of the neural network.

To take the example further, a third level of testing can be that the full FOV is activated with all colors but at a lower resolution, for example 1MP instead of 8MP (if that is the maximum resolution of the camera module 201). The image is again sent to the neural processing unit 209 and the analyzer 205, this time with a different set of weights. Testing can, for example, look to see whether a person and a face can be recognized; if so, the analyzer 205 will decide to go to the next power level.

To take the example still further, if a fourth power level of testing is reached, an image with full 8MP resolution will be taken. The ISP 203 will crop the face and/or other biometrical attributes and send the information to the neural processing unit 209 and the analyzer 205 for identification. If the imaged person is identified as a user, the item or device will be triggered to open/unlock depending on the use case.

To handle the case in which, at a certain point the user has changed appearance from the baseline (e.g., is no longer wearing a green shirt and blue trousers) and is not recognizable at the lowest level of testing using the most-recent (but now outdated) model, the full system can be further configured to turn on and provide the image to a more capable processor for identification/analysis. The more capable processor can be configured to be nearby the camera module 203 (e.g., disposed within the host system 202 as illustrated in FIG. 2A), or alternatively it can be a central computing resource (e.g., server, mobile edge cloud, etc.). The design choice of how to configure any particular embodiment depends on a number of factors, including whether the low-power system is to be a stand-alone system, or whether it is part of a larger system of sensors and gates—in the latter, an updated profile might need to be shared with the other sensor nodes. In the examples presented herein for purposes of illustrating aspects of inventive embodiments, a local application processor is assumed, since it would be the natural system implementation (there should be a CPU with an ISP and some image processing in the form of accelerator/GPU/NPU). But it will be noted that, for example, the final one or two steps 305, 307 of processing (see FIG. 3) can be performed in a system that is not local to the system 200, so that communication between the sensor system and the more capable device is needed.

The change from one of the power-saving states to the full system being on can be done from any of the power levels. One trigger of this could be that when a person stands sufficiently close to the associated device (e.g., car), at least a certain number of horizontal pixels will be filled and that will trigger the full system. Other triggers are also possible.

Further aspects of embodiments consistent with the invention will now be described with reference to FIG. 5, which in one respect is a flowchart of actions performed by the system 200 in accordance with a number of embodiments. In other respects, the blocks depicted in FIG. 5 can also be considered to represent means 500 (e.g., hardwired or programmable circuitry or other processing means) for carrying out the described actions.

Before the system 200 can recognize a particular object/user, it must first perform initializing actions that include taking baseline measurements (step 501) of the object/user and calculating what sensor settings (e.g., which sensing structures 420 should be activated) for lowest power mode recognition of a particular object/user (step 503). At the conclusion of the initializing actions, the system 200 is ready to recognize the particular object/user when that object/user is detectable by the camera module 203.

During operation, the system 200 is in an adaptive identification sleep mode (step 505) that consumes a lowest amount of energy. The system 200 can be configured to detect when an object/user is being presented to the camera module 201 and in response to the detection, to use a previously generated baseline model of an authorized object/user to select and activate a lowest number of sensing structures 420. Alternatively, the system 200 can be configured to be always-on with a lowest number of sensing structures 420 always selected and activated so that an authorized object/user can be immediately recognized when presented to the camera module 201. In this alternative, there is no need to detect that an object/user has come within view of the camera module 201.

In a scanning step 507, signals from the active sensing structures 420 are compared with the baseline model (e.g., by comparing the strength of the signals to a threshold) (decision block 509). If the comparison fails ("No" path out of decision block 509) then the system 200 remains in the lowest power state and processing in some embodiments reverts back to step 507.

Looping between steps 507 and 509 when the system fails to recognize a particular object/person is consistent with low-power, always-on operation and may be sufficient in some use cases. In some but not necessarily all embodiments, the system 200 can be further configured to handle situations in which an object or user that should be recognized is, for some reason, not recognized. To avoid endless looping, the system 200 can be further configured to include a mechanism that allows the user to override the low power operation and force the system to transition to a higher-power analysis that would then more accurately decide whether the object/person is recognized. For example, as shown in FIG. 5, upon failing to recognize the object/user at decision block 509, the system 200 can test to determine whether an override operation has been triggered (decision block 510). An override operation can be triggered by an action such as the user pressing a button, or gripping a doorknob. The particular form of such triggering is not essential to inventive embodiments. If no override is detected ("No" path out of decision block 510), then processing continues to step 507 as discussed above. But if an override has been triggered ("Yes" path out of decision block 510), then higher level processing is invoked to provide a more reliable (and more power consuming) analysis. In some embodiments, this involves sending information about the failed scan to a host system 202 or other higher level processor for analysis (step 511), the host system (or other) processor performing the higher level analysis (step 513) and performing another test against a threshold (decision block 515). If this test passes ("Yes" path out of decision block 515) then the object/user is considered to be identified (step 517). Further actions, triggered by the recognition, can then be performed. But if this test fails ("No" path out of decision block 515), the object/person was not recognized and the system 200 can revert to its adaptive identification sleep mode (step 505).

Referring back now to decision block 509, step 519 is reached if the initial comparison of the signals from the active sensing structures 420 with the baseline model passed ("Yes" path out of decision block 509). Successfully passing the lowest level testing means that the system is now willing to expend more energy to determine with greater accuracy whether the object/user presented to the camera module 201 is actually an authorized object/user. Accordingly, a next (increased) number of sensing structures 420 is activated (step 519), a comparison of the activated sensor signals with a baseline measurement is made (step 523) (e.g., by processing elements of the host system 202), and the comparison result is compared with a predetermined threshold value (decision block 525). If the comparison result is greater than or equal to the predetermined threshold value ("Yes" path out of decision block 525) the object/person was again recognized by this next level of processing, so to provide even greater accuracy processing continues to step 511 and further actions are taken as described above. As previously discussed, this involves performing an even higher-level analysis by the host system 202 or other processing system that is more capable but also more energy demanding than what is done in the camera module 201.

If the comparison result is lower than the predetermined threshold value ("No" path out of decision block 525) then the higher number of activated sensors are deactivated (step 527). At this point, actions may further include adjusting the predetermined threshold value and/or other hysteresis-related parameters), deactivating the host system 202 (if it had been activated) and returning to a lowest level of energy consumption operation at step 507.

The exemplary embodiment of FIG. 5 illustrated three increasingly power consuming levels of analysis. However, other embodiments could differ, for example using only two levels or using more than three levels.

Further aspects of embodiments consistent with the invention will now be described with reference to FIG. 6 which, in one respect, is a flowchart of actions taken by the system 200 in accordance with a number of embodiments. In other respects, the blocks depicted in FIG. 6 can also be considered to represent means 600 (e.g., hardwired or programmable circuitry or other processing means) for carrying out the described actions.

FIG. 6 focuses on actions taken as part of system initialization. As mentioned above, during operation the system 200 relies on one or more baseline models which specify key image features that should be looked for during each stage of authorization processing. FIG. 6 focuses on aspects relating to the creation and updating of a baseline model.

An initial test decides whether the camera module 201 is presently imaging an object/user that it has decided is an approved object/user (decision block 601). This decision can be made by, for example, taking actions such as those described above with respect to FIG. 5.

If the system 200 detects that it is imaging an approved object/user ("Yes" path out of decision block 601) this means that a baseline model for that object/user already exists. The question is whether it should be updated to take into account a changed appearance of the object/user. Accordingly, a picture of the object/user is obtained (e.g., a high resolution image) (step 603) and features from the obtained image are compared with corresponding features of the stored model to produce a set of calculated differences and the model is updated accordingly (step 605). Predefined threshold levels that are used during the authorization process (e.g., refer to FIG. 5) at different power levels are adapted based on the updated information (step 607) and these are stored as well.

So long as the object/user remains in front of the camera ("No" path out of decision block 609), the system 200 can continue to take more pictures and update the model accordingly, although this is not an essential aspect of this feature.

Once the object/user is no longer in front of the camera module 201 ("Yes" path out of decision block 609), the model has been updated and system operation begins at the lowest energy consumption level (step 611). A device associated with the system 100 is also put into a locked/deactivated state (step 613).

Returning to decision block 601, if the object/user presently in front of the camera module 201 is not recognized as an approved object/user ("No" path out of decision block 601) then the question is whether this object/user is an authorized one for which a baseline model should be created. One way of testing this is detecting whether an authorization token is being presented to the system (decision block 615). If not ("No" path out of decision block 615) then the device associated with the system 200 should be maintained in a locked/deactivated state (step 617).

But if a valid authorization token is presented to the system 200 ("Yes" path out of decision block 615) then there can be an optional step to further determine whether this is an appropriate time to build a model (decision block 619). If not ("No" path out of decision block 619), then the object/user has been authorized (i.e., by means of an authorization token) and the device associated with the system 200 should be activated/opened (step 621).

If a baseline model should be built at this time ("Yes" path out of decision block 619), then some number of pictures (the exact number depends on the particular algorithm being used) are taken of the object/user, important features extracted from those pictures, and the resultant model (e.g., a two- or three-dimensional model) built (step 623). It is advantageous to calculate the model using a higher-level (e.g., highest level) processing capability, since model building is a power- and processing-intensive activity. The model is then stored so that it can be ready for use (step 625) and processing proceeds to step 607 in which parameters of the system 200 are initialized for use at each of the different power levels. Further processing continues as already described above.

Additional features are now described with reference to FIGS. 7A and 7B which, in one respect, are in combination a flowchart of actions taken by the system 200 in accordance with a number of embodiments. In other respects, the blocks depicted in FIGS. 7A and 7B can also be considered to represent means 700 (e.g., hardwired or programmable circuitry or other processing means) for carrying out the described actions in order to authorize activation of, for example, devices associated with (e.g., by means of proximity) the system 200.

The strategy adopted in the illustrated embodiment involves, loading the one or more latest models of known users (step 701) and for each user, calculating pixel values that will be used in the low power state (step 703). Before the low power mode of the camera module 201 is activated, the calculated settings are loaded into the user/object register 255 (step 705), and these loaded settings will set the thresholds for all colors and the number of rows that are active for each user. The user/object register 255 has room for at least one user.

After the setting(s) for all users are set, the model for the background is put in place. The background model is calculated (step 707) every time just before the low power mode of the sensor is activated. From the background model, pixel values and thresholds for colors and number of sensing structures 420 (e.g., rows of pixels) that will be actively scanned are calculated (step 709) and loaded into the background register 257 (step 711).

Once all users and background models are set the sensor goes into low power mode (step 713). In low power mode each user setting is scanned one after another. In some but not necessarily all embodiments, the background setting is also scanned as a last step. If the signal from the sensor is over or under a set threshold a trigger is sent to the host.

More particularly, the sensor 251, 401 is scanned based on the loaded user setup (step 715). The output from the sensor 401 is compared to the loaded threshold value (decision block 717), and if the comparison passes (e.g., is greater than or equal to the threshold) ("Yes" path out of decision block 717), then the host system 202 is triggered/activated (step 719) to further process a scanned image to decide, with better accuracy, whether the object/user presented at the sensor 401 is recognized. This higher level processing may, in some embodiments, comprise several levels of ever higher level processing, as described above.

If the output from the sensor 251, 401 does not pass the threshold test ("No" path out of decision block 717), processing determines whether the last object/user in the list of known objects/users has been checked (decision block 721). If not ("No" path out of decision block 721), settings for the next object/user in the list are loaded into the camera module 201 (step 723), processing reverts back to step 715 for further testing.

If the last user in the list has been checked without being recognized ("Yes" path out of decision block 721) The sensor is scanned using the loaded settings for the background (step 725). The strategy assumes that, so long as no object or person is presented to the camera module 201, it should be "seeing" only the background, and its output should accordingly be more or less constant over time (within some tolerance level, determined based on application). The strategy allows for some level of background deviation since, for example, people may be walking by the sensor without presenting themselves, lighting conditions can change over time, and the like. Therefore, with the background settings in effect, the sensor output is checked against its corresponding threshold level (decision block 727) to see whether or not it is stable. If the sensor output is within some predetermined margin of the threshold ("Yes" path out of decision block 727) then no significant change has been detected. To avoid the possibility that the system 200 might miss the appearance of an object or person being presented to the camera module 201, the effective system settings are changed to be those of the first user in the list (step 729) and processing reverts to step 715 and proceeds as discussed above.

It is desired to be able to recognize a known user even if there is some change in their appearance, for example, if the user has changed clothing or looks different in another way (e.g., changed hair color). Therefore, if the output of the camera module 201 is not within the margin of the threshold ("No" path out of decision block 727), the host system 202 is activated/triggered (step 719) to further process a scanned image to decide, with better accuracy, whether the object/ user presented at the sensor 251, 401 is recognized. This higher level processing may, in some embodiments, comprise several levels of ever higher level processing, as described above. It is recognized that this may lead to more activations of the higher-power consuming system, but being able to recognize a user even when some changes in appearance have been made justify this action.

Despite the power savings achieved by embodiments such as those just described, there is still room for improvement. One area where problems still exist in current solutions to the challenge of object detection for a positive user ID relates to the amount of power consumed by the sensor and the host subsystem. Although various proposals exist for how to reduce the power consumption, these are still fairly high and not suitable for an always-on battery-driven device. For example, the above-described arrangement that relies on a multiple-staged approach, where the first stage of sensor data analysis is implemented in the sensor with ultra-low power consumption and hence suitable for an always-on system, does not itself address how much power is consumed by the sensor when operating at the lowest level of analysis. Although the arrangement achieves power savings compared to conventional arrangements that require more processing at all times, it is still desirable to further improve performance at a lowest level of processing.

Conventional solutions to the problem of providing optimized sensor structures for performing activity detection typically trigger on any lighting change/activity. In areas where there are frequent activities or changes in the lightning, such sensors lead to unnecessarily high activation levels if there are only rare situations where a relevant person or object becomes visible and should trigger further actions.

There is therefore a need for technology that addresses the above and/or related problems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology (e.g., methods, apparatuses, nontransitory computer readable storage media, program means) that provides for low-power always-on image sensing and pattern recognition. In some embodiments consistent with the invention, the technology is an optical sensor module having a controller, a sensor array, present state decision circuitry, and a pattern recognizer. The sensor array comprises a plurality of CMOS sensor pixels, wherein the sensor array is configured to supply one of a plurality of analog sensor signals at each of a sequence of sample times, wherein at each of the sample times, the one of the plurality of analog sensor signals is derived from one or more of the plurality of CMOS sensor pixels. The present state decision circuitry is configured to compare the one of the plurality of the analog sensor signals for each of the sequence of sample times with a respective controller-selected reference voltage and to generate therefrom a respective single state decision signal. The pattern recognizer is configured to assert a pattern recognition signal whenever a plurality of sequentially generated single state decision signals matches a currently active one of a set of one or more reference sequences of single state decision signals. The controller is configured to assert a host system trigger signal when the pattern recognition signal is asserted a predefined number of times in sequence.

In an aspect of some but not necessarily all embodiments, at least one of said one of the plurality of analog sensor signals is an analog sensor signal representing an output from a single one of the plurality of CMOS sensor pixels.

In an aspect of some but not necessarily all embodiments, at least one of said one of the analog sensor signals is a binned analog sensor signal produced by two or more of the plurality of CMOS sensor pixels.

In an aspect of some but not necessarily all embodiments, the set of one or more reference sequences includes at least two reference sequences of single decision signals; a first one of the set of one or more reference sequences differs from a second one of the set of one or more reference sequences; a first assertion of the pattern recognition signal occurs at a first time whenever the plurality of sequentially generated single state decision signals matches the first one of the set of one or more reference sequences; a second assertion of the pattern recognition signal occurs at a sequentially second time whenever the plurality of sequentially generated single state decision signals matches the second one of the set of one or more reference sequences; and the controller is configured to assert the host system trigger signal whenever the pattern recognition signal is asserted at both the first and second times.

In an aspect of some but not necessarily all embodiments, the optical sensor module further comprises a voltage multiplexor that selects the controller-selected reference voltage from a plurality of reference voltages, wherein the controller is configured to select the controller-selected reference voltage based on profile information stored in a register.

In an aspect of some but not necessarily all embodiments, the optical sensor module further comprises one or more Dynamic Vision Sensor, DVS, sensor pixels that collectively assert a DVS trigger signal when luminance detected by at least one of the one or more DVS sensor pixels changes by a threshold amount.

In an aspect of some but not necessarily all embodiments, the controller is configured to:
  operate the optical sensor module in an ultra-low power mode in which all of the CMOS sensor pixels are deactivated and only the one or more DVS sensor pixels are active; and
  transition the optical sensor module to operate in a low power mode in response to the DVS trigger signal being asserted, wherein at least one of the CMOS sensor pixels is activated when the optical sensor module operates in the low power mode.

In an aspect of some but not necessarily all embodiments, operation in the low power mode comprises activating at least one but fewer than all of the CMOS sensor pixels.

In an aspect of some but not necessarily all embodiments, the controller is configured to increase a number of activated CMOS sensor pixels when the host system trigger signal is asserted.

In an aspect of some but not necessarily all embodiments, the present state decision circuitry further comprises circuitry configured to invert a polarity of the single state decision signal.

In an aspect of some but not necessarily all embodiments, the optical sensor module (801, 1301) is comprised in a mobile communication device.

In an aspect of some but not necessarily all embodiments, the optical sensor module (801, 1301) is comprised in a low-power sensor device.

In aspects of some but not necessarily all embodiments, methods are provided that include actions consistent with at least any of the above described embodiments.

BRIEF DESCRIPTION OF THE DRAWINGS

The objects and advantages of the invention will be understood by reading the following detailed description in conjunction with the drawings in which.

DETAILED DESCRIPTION

Figure 1A:
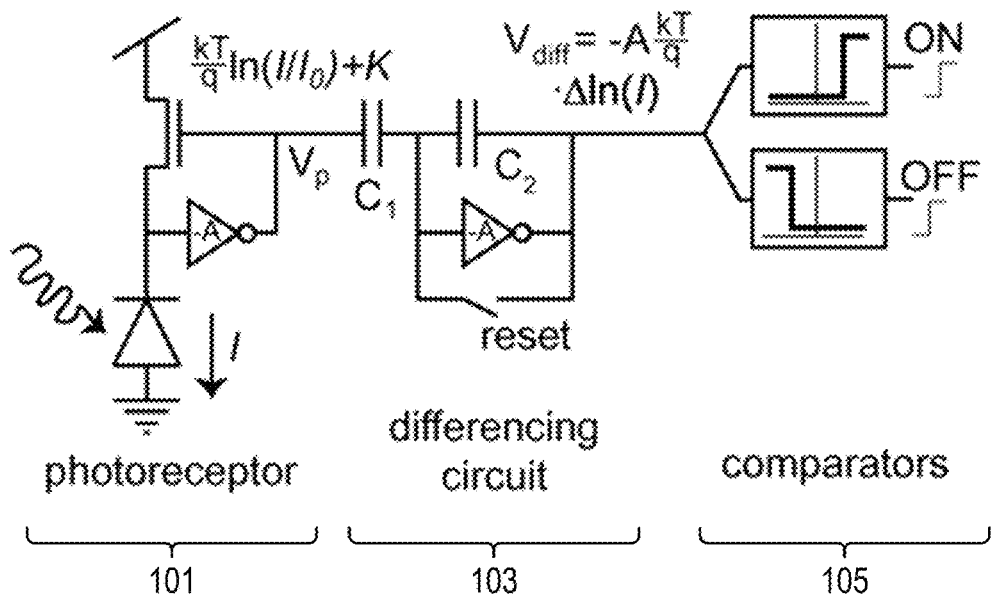
FIG. 1A is a schematic diagram of a DVS sensor.
Figure 1B:
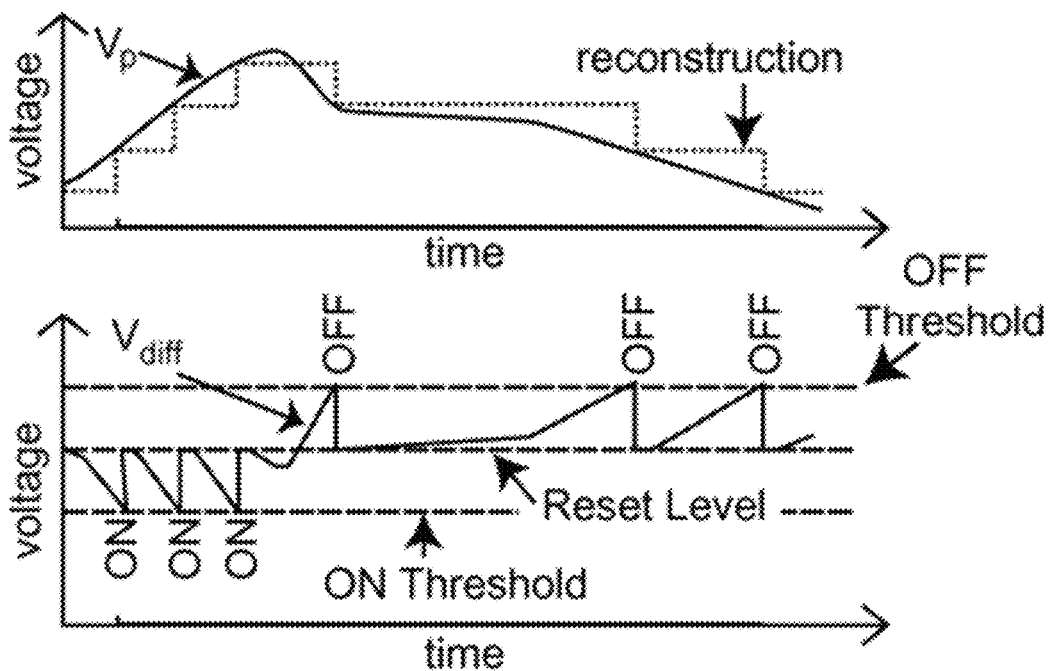
FIG. 1B is a diagram illustrating the principle of operation of a DVS sensor.
Figure 2A:
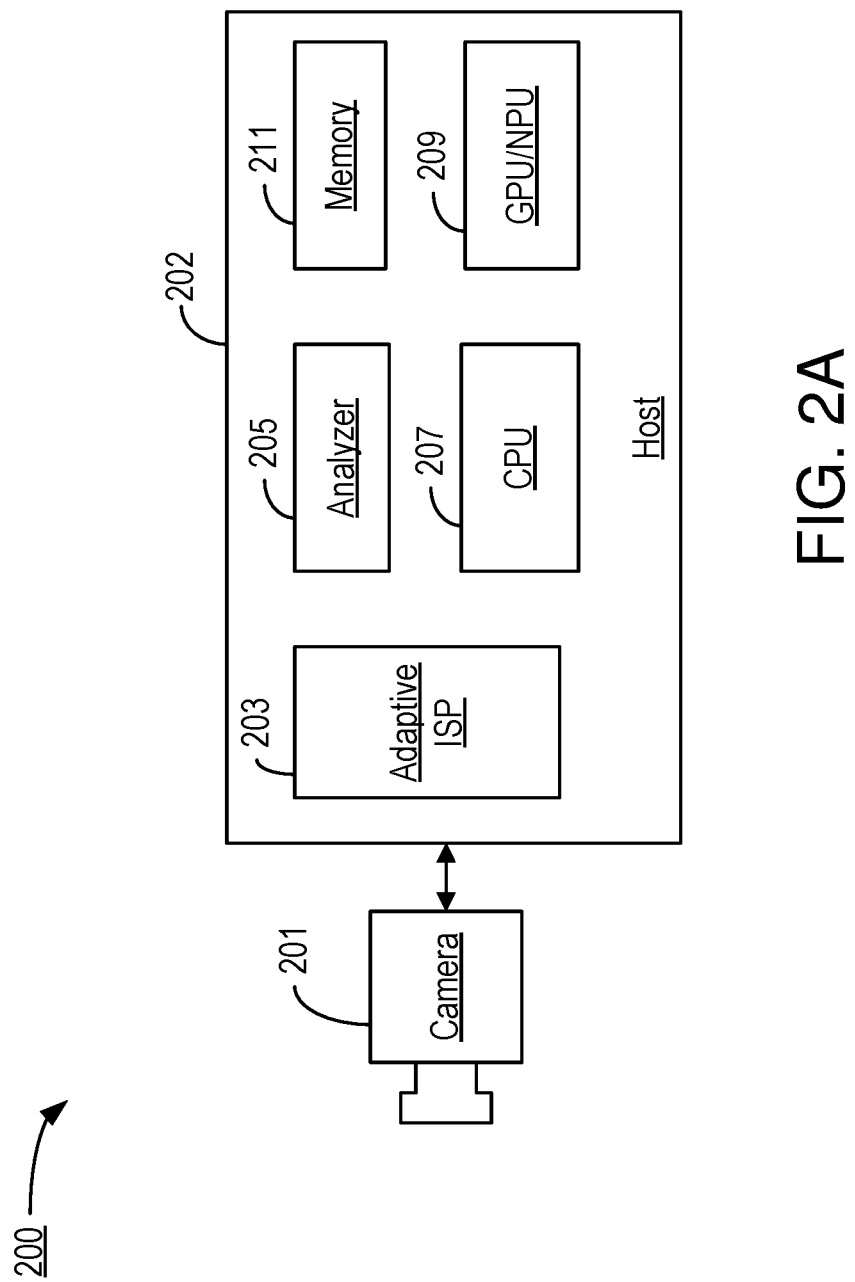
FIG. 2A is a block diagram of a low-power object detection/identification system for authorizing performance of a device action.
Figure 2B:
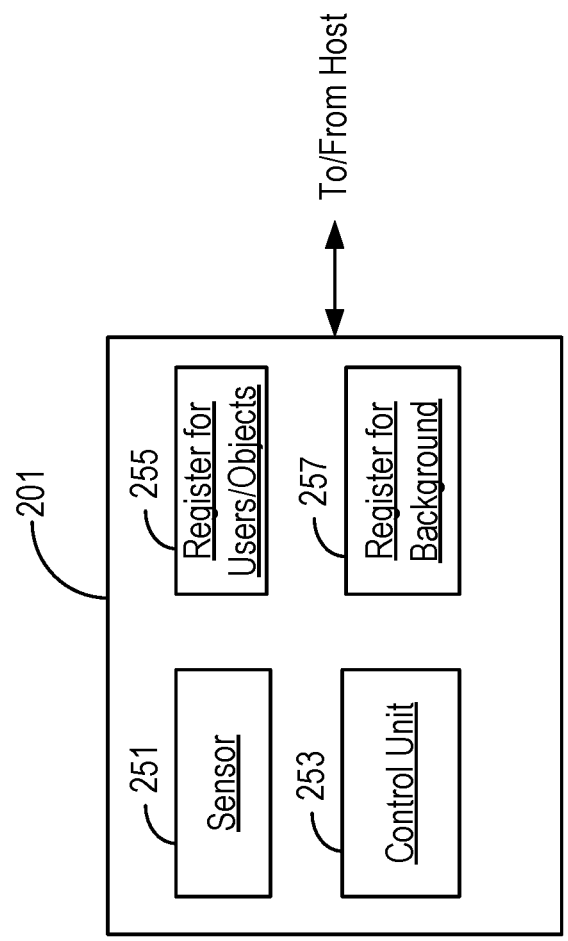
FIG. 2B is a block diagram of an exemplary embodiment in which power savings are achieved by performing a device authorization/activation process in stages, with a lowest-power stage being performed by a camera module.
Figure 3:
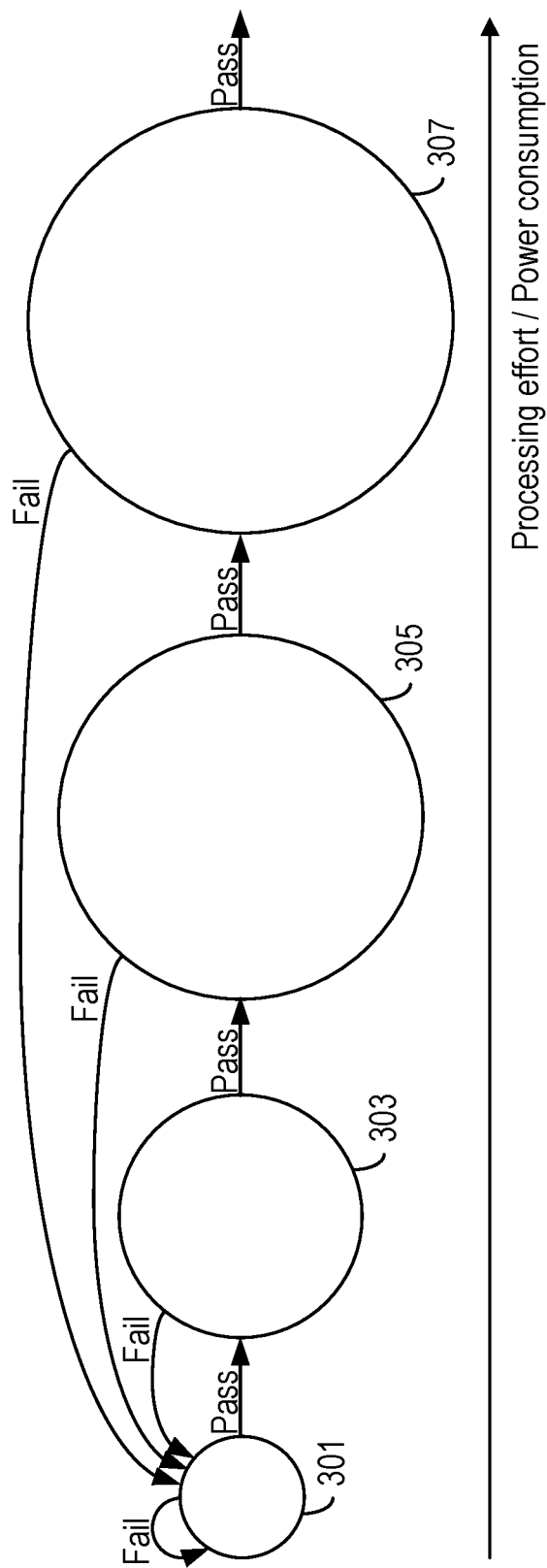
FIG. 3 is a schematic/state diagram illustrating the concept of a multi-stage authorization/activation process.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone, one or more programmed processors, or any combination of these). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

An aspect of the herein-described technology pertains a highly optimized sensor design and mechanisms that are suitable for the initial stages of object analyses for a system that can be always-on. The system design utilizes a multi-stage approach in which decisions made at the lowest level of analysis or triggering mechanism have the least confidence but are made with minimal power consumption. A positive triggering at that lowest stage leads to a subsequent stage of a (perhaps slightly) more complex analysis—one that is still far below the level of complexity (and power consumption) associated with a host system involving CPUs, GPUs, or NPUs as well as data communication between chips.

In one aspect, the first level of detection is produced by a sensor having a sparse matrix of DVS (Dynamic Vision Sensor) pixels embedded in an otherwise conventional CMOS matrix. Additional circuitry is provided to enable operation in which the CMOS matrix remains inactive while the DVS pixels detect changes. When enough such pixels indicate a change above a certain threshold, a triggering signal is generated indicating that something fundamental has changed in the image. The trigger from the DVS mechanisms causes the mode of operation to change from the lowest level to a second ultra-low power mode in which a subset of the CMOS array is activated. This subset operates in conjunction with analog circuitry as well as simple state machines that, together, enable analysis of the sensed color patterns at a very low level of power consumption. The second ultra-low power mode mechanism is able to test the sensed image against a limited set of user profiles, thereby allowing this stage to trigger (i.e., indicate a match) based on different possible patterns.

Upon the occurrence of a positive triggering from this second stage, the sensor can be put into a more normal mode, or a previously known sub-array mode, for a more in-depth analysis of camera content in, for example, a host processor in the device. This type of mode consumes much more energy but comes with the benefit of higher confidence in the decisions being made. Several different options for implementing the higher-level analysis are generally known, and it is beyond the scope of this invention to describe these in detail.

Figure 4:
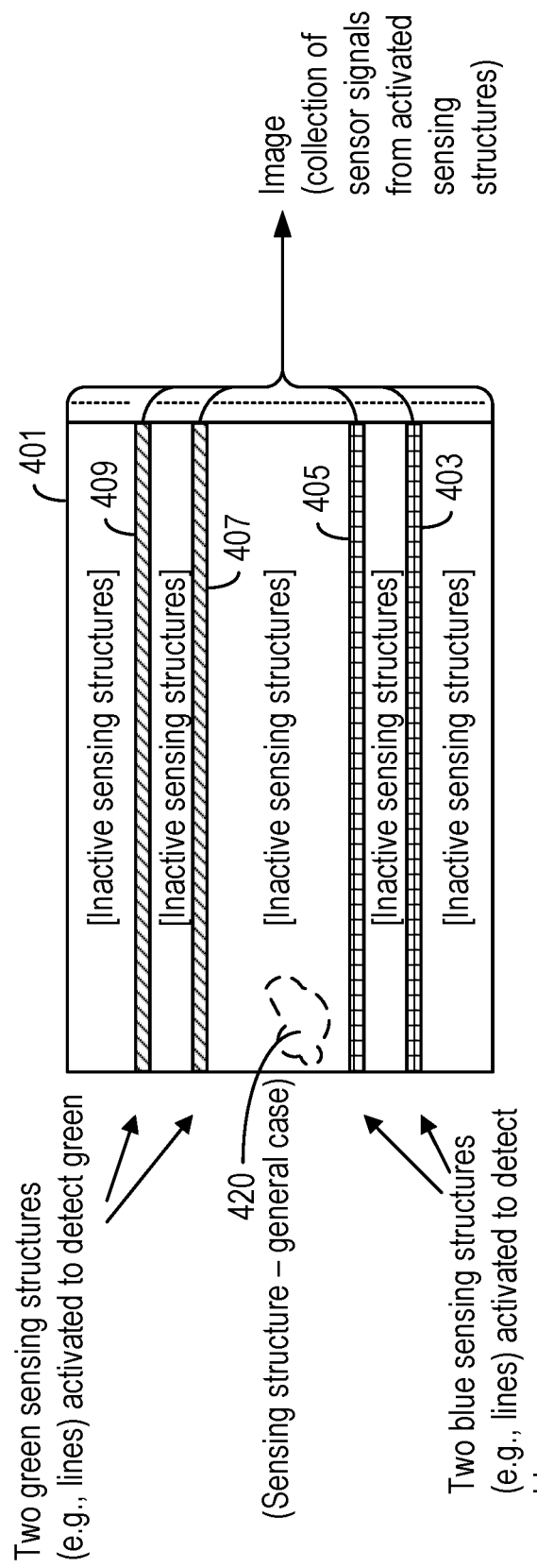
FIG. 4 illustrates a camera having an array of pixel elements some of which are in an activated state, and others of which are inactivated.
Figure 5:
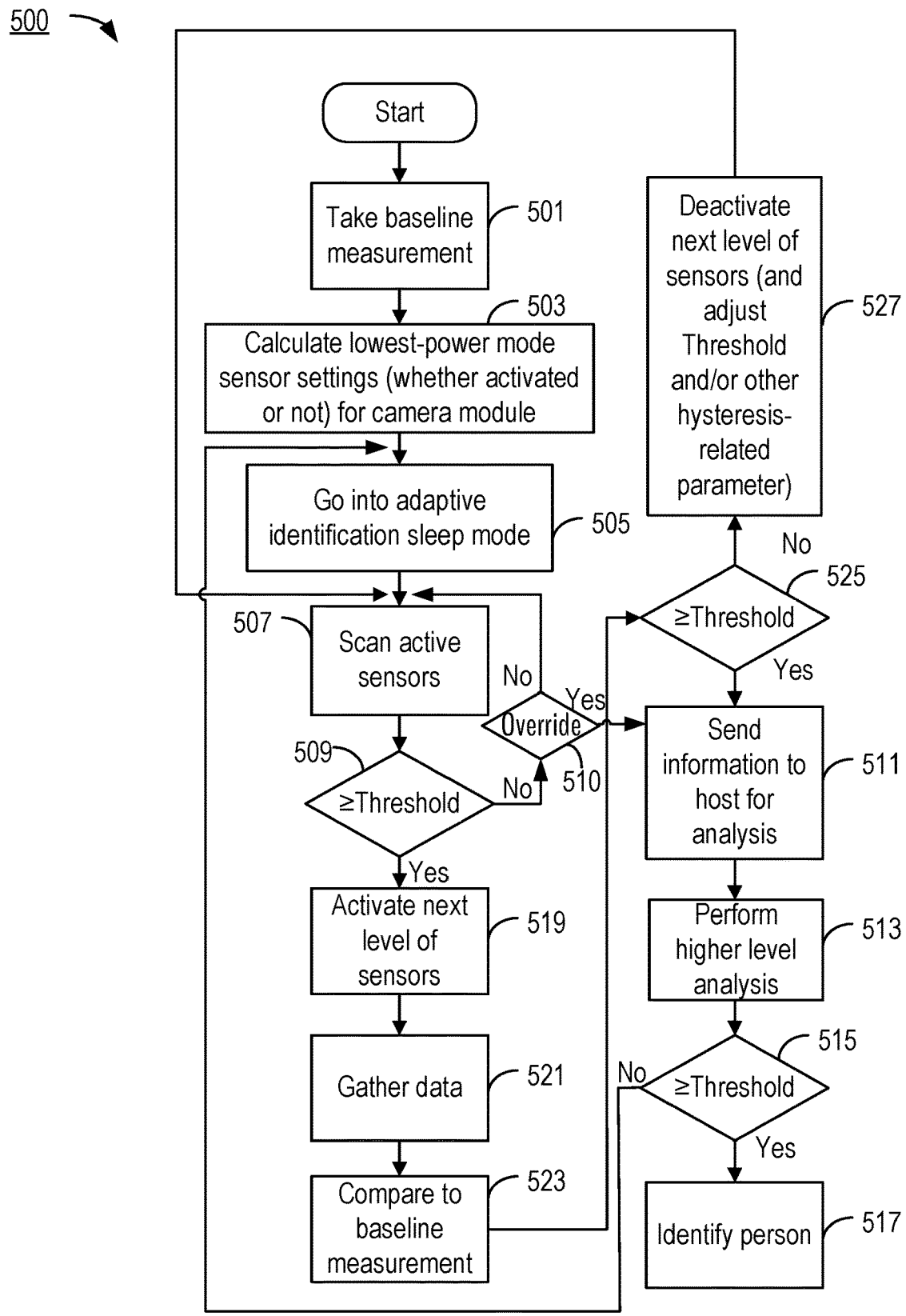
FIG. 5 is, in one respect, a flowchart of actions performed by the system in accordance with a number of embodiments.
Figure 6:
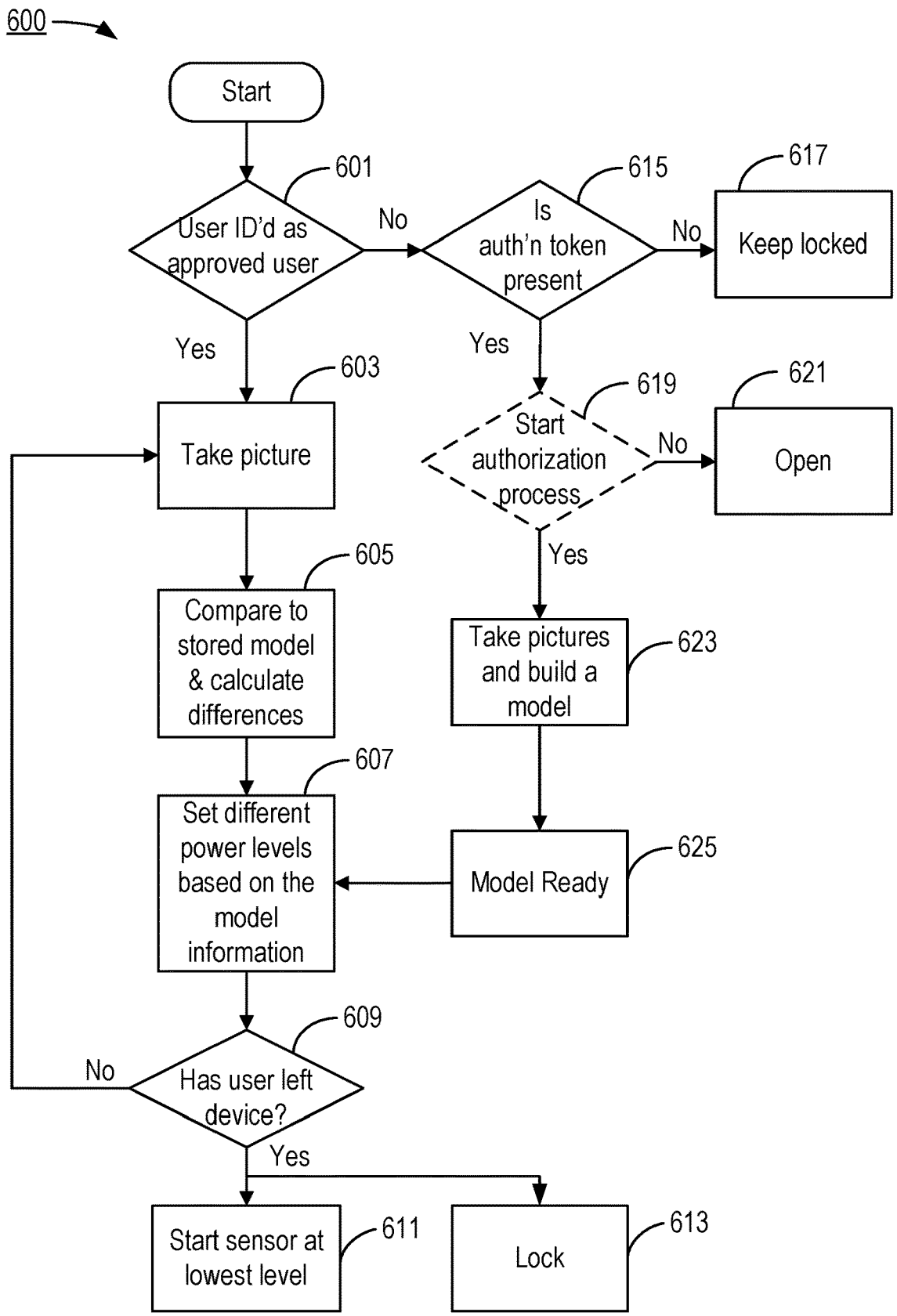
FIG. 6 is, in one respect, a flowchart of actions performed by the system during initialization in accordance with a number of embodiments.
Figure 7A:
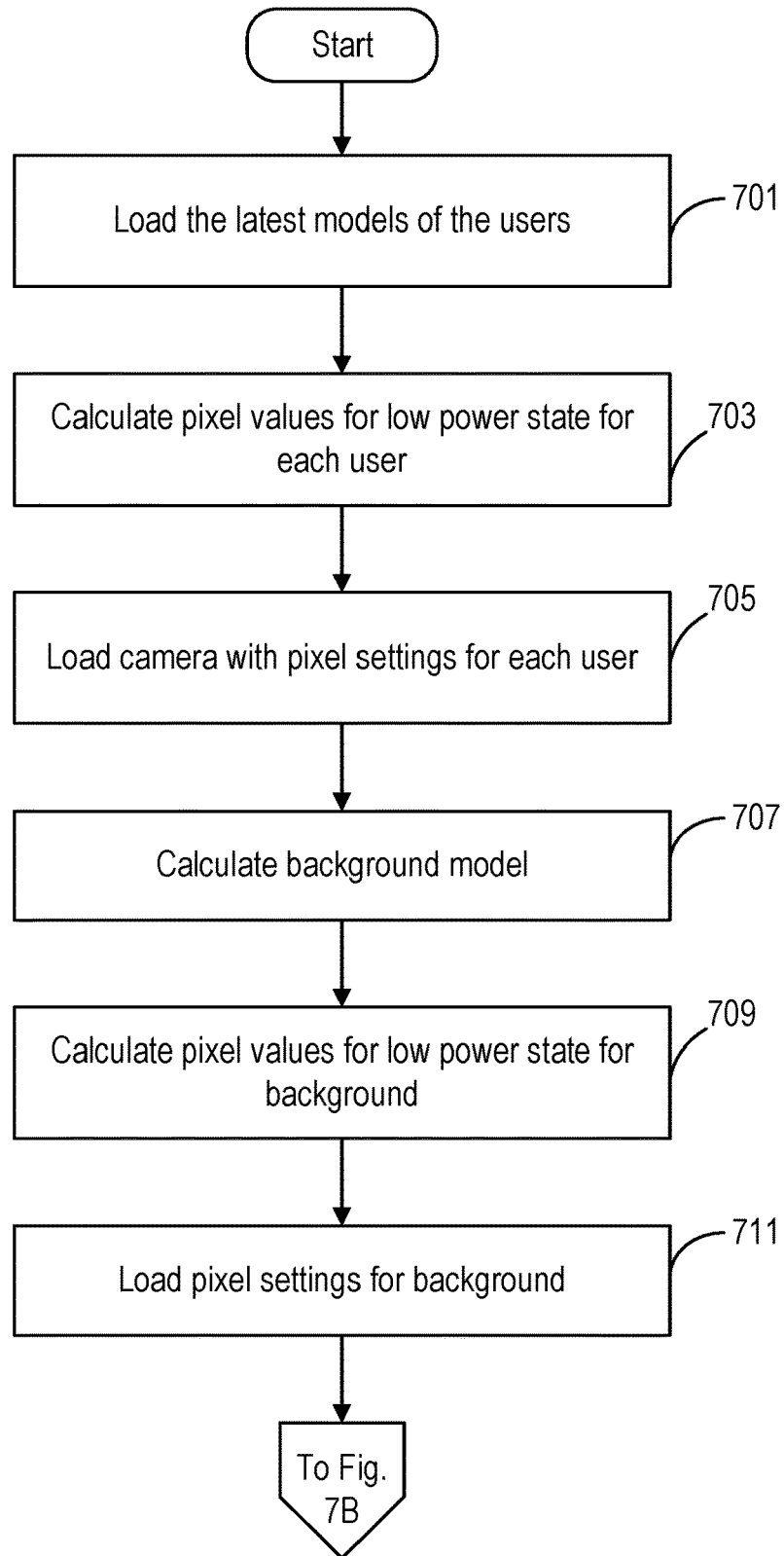
FIGS. 7A and 7B are in combination, in one respect, a flowchart of actions taken by the system in accordance with a number of embodiments.
Figure 7B:
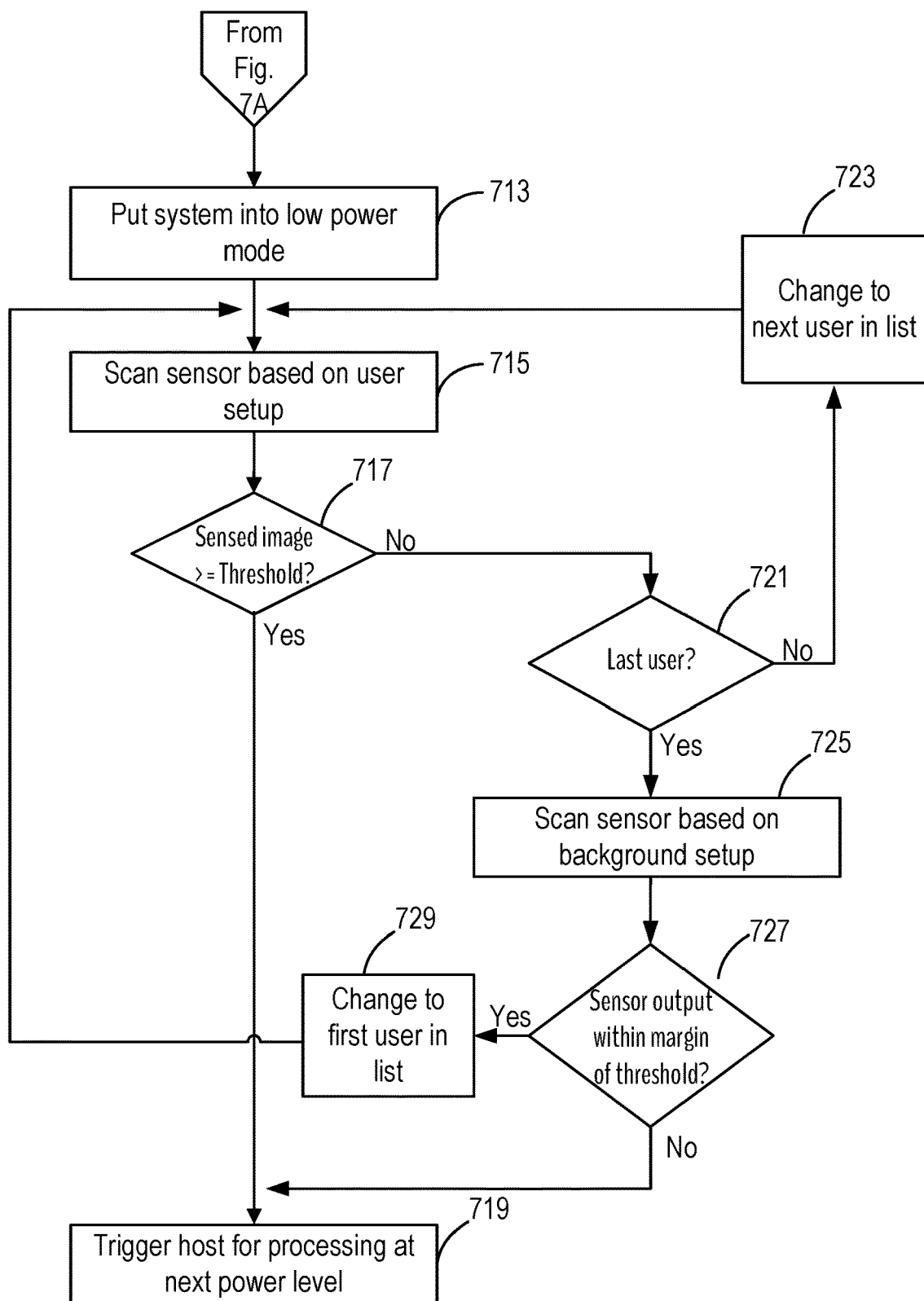
Figure 8:
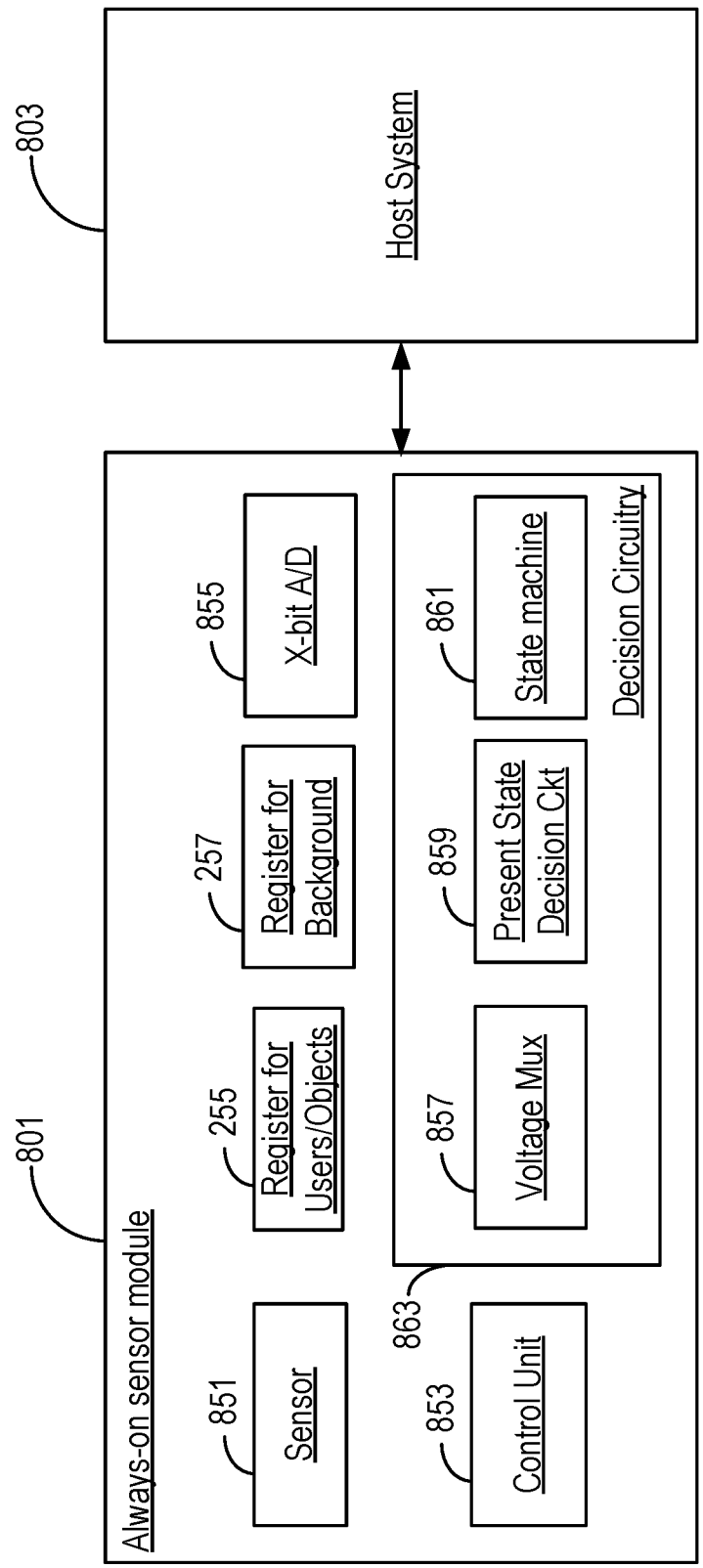
FIG. 8 is a block diagram of a system including an always-on sensor module coupled to a host system.

These and other aspects will now be described in greater detail in connection with the figures. Referring first to FIG. 8, it is a block diagram of a system including an always-on sensor module 801 coupled to a host system 803 such as, but not limited to, the exemplary host system 202 described earlier. The sensor module 801 comprises a sensor array 851 comprising a plurality of sensing structures that are configurable as was discussed earlier with reference to FIG. 4. In addition to the configurable sensing structures, in some but not necessarily all embodiments the sensor array 851 is further populated with some number of DVS pixels (i.e., in addition to the CMOS pixels), this being for enabling ultra-low always on features as will be further described below.

The sensor module 801 further comprises a control unit 853 for controlling the various components of the sensor module 801 in a way that conforms with the various actions described herein.

In one respect, the sensor module 801 is able to make an initial conclusion whether an object or person being presented to the sensor array 851 is one of one or more previously authorized objects/persons, and to facilitate this function the sensor module 801 includes a register 255 for users/objects. As will be discussed further below, recognition of an object/person includes detecting whether a sufficient number of activated sensing structures are being triggered by the object/person being presented, and this means comparing the number of triggered sensing structures to a threshold. It is a purpose of the register 255 for users/objects to store settings for all of the objects/users that are available in a given model. There may be one or more than one such object/user.

The initial conclusion made by the sensor module 801 should be understood as being a sufficiently close match (within a defined threshold) between the results of the sensed data and the data stored in the register 255 per user/object or version of user/object, and the like. The initial conclusion is not made with 100% certainty. But finding an initial match provides sufficient confidence to warrant engaging a higher power stage of analysis that can be used to further enhance the detection and security of the detection with additional sensors or pixels to give higher resolution and the like. By forming an initial conclusion as presented herein, the system is able to expend only minimal energy in order to avoid having non-matching conditions constantly wake up the higher power system. The ratio of negative detections will likely always be much higher than positive results, thus resulting in significant power savings.

In another respect, the sensor module 801 is able to detect when no object/user is being presented to the sensor array 851 and to remain in a very low (or in some embodiments, an ultra-low) power state under such circumstances, and then to be able to revert to a more active state when something (object/person) is then presented to the sensor array 851. This function involves tracking whether the sensor array 851 presently detects an image corresponding only to an image of an environmental background (i.e., an image without an object or person being presented to the sensor array 851). So long as only background is detected, the sensor module 801 can remain in the very (or ultra) low power state. If a sufficient enough change to the scanned image is detected, the more active state is entered. To facilitate this purpose, the sensor module 801 further includes a register 257 for a background image. It is a purpose of the background image register 257 to store settings for a background that is available in a given model.

In addition to the above-mentioned elements, the exemplary sensor module 801 further includes:

A control unit 853 that generates control signals that cause the sensor module 801 to operate in any of a number of different sensor modes.

An X-bit A/D converter 855 for supplying conventional digital image output from the sensor module 801 (e.g., for use by a host system 803).

Decision circuitry 863 that decides whether specific pattern of image features have been detected on the sensor array 851 and asserts a signal indicating a decision result. The decision circuitry 863 includes in some, but not necessarily all, embodiments:

Voltage multiplexor 857 that generates any of a plurality of reference voltages that serve as thresholds for deciding whether or not specific image features are presently detected on the sensor array 851.

A present state decision circuit 859 that generates a trigger signal that indicates when specific image features are presently detected on the sensor array 851.

A state machine/pattern recognizer 861 that recognizes patterns of trigger signals from the present state decision circuit 859 and asserts a match signal when a detected pattern matches a template. Assertion of the match signal causes associated actions to be triggered.

In an aspect of its operation, the sensor module 801 supplies an image to the host system 803 for it to undergo a more computationally complex analysis once an object has been detected using the lower-power detection strategies of the sensor module 801 itself.

In one aspect of some embodiments, always-on operation is facilitated by utilizing a sensor array 851 populated with both CMOS sensor (pixel) elements and DVS sensor (pixel) elements. The CMOS sensor elements are further configured to be dynamically configurable such that only selected ones are activated, based on what level of sensor resolution is desired. Power savings are achieved because only the activated sensor elements expend energy. These aspects are discussed in greater detail in the following.

Figure 9:
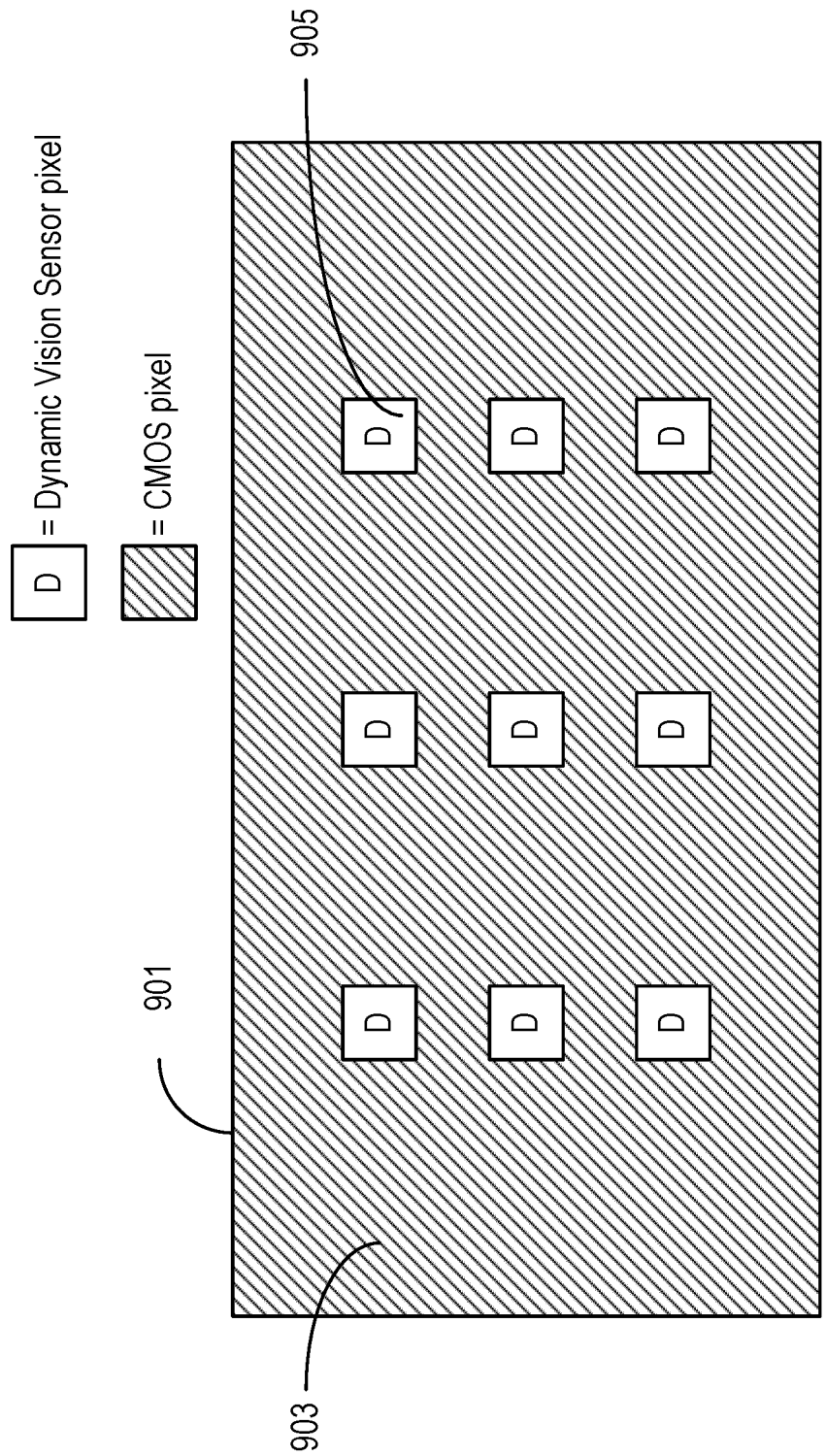
FIG. 9 is a diagram of a non-limiting example of a sensor array.

FIG. 9 is a diagram of a non-limiting example of a sensor array 901. The sensor array 901 comprises a plurality of CMOS sensor pixels 903 (illustrated by diagonal shading), and also one or more DVS sensor pixels 905 (each one of the sensors denoted by "D"). During ultra-low power operation, none of the CMOS sensor pixels 903 are activated. Instead, the DVS sensor pixels 905 are relied on exclusively for the purpose of detecting changes in luminescence. Such changes are taken as an indication that some person/object has come into view of the sensor array 901, requiring that a next higher level of processing be activated to determine whether the person/object is recognized. Since the DVS sensor pixels 905 serve only to indicate the presence or absence of an object in front of the sensor array 901, there need not be many of them. In the example, there are only a few DVS sensor pixels 905 spread out over the sensor array 901 to cover the field of view of the camera, thus being able to detect changes in luminescence over a larger area. Since the DVS sensor pixels 905 occupy positions that would otherwise hold CMOS sensor pixels, the image data from the "missing" CMOS sensor pixels can be calculated/estimated from data provided by neighboring conventional pixels. This may possibly produce some artifacts in those areas. The calculations involved in providing the missing data are the same as calculations known by those of ordinary skill in the art for compensating for defective pixels on a sensor. There are a number of well-known algorithms for accomplishing this, such as nearest neighbor calculations, bi-linear interpolation, linear interpolation, and the like. A complete description of such known algorithms is beyond the scope of this disclosure.

The CMOS sensor pixels 903, on the other hand, are used to provide image data that is analyzed to detect the presence of a recognized image. As described earlier with reference to FIGS. 3 through 7B, the analysis may be performed at any of a number of different levels of image resolution, and to save energy, only those CMOS sensor pixels 903 necessary to satisfy the desired level of resolution are activated. A design of a suitably configurable CMOS image sensor is described in U.S. patent application Ser. No. 16/860,248. The use of Backside Illuminated CMOS sensor technology or similar stacking in the manufacturing process allows for a more complex sensor design without affecting the aperture ratio of the sensor, as described in the just-mentioned U.S. patent application. It will be understood that the use of such processing technology is not an essential aspect of the herein-described embodiments.

In many embodiments, the number of CMOS sensor pixels 903 greatly outnumbers the number of DVS sensor pixels (which, as noted above, can be treated as "defective" pixels when the CMOS sensor pixels 903 are operational). Therefore, the CMOS sensor pixels 903 comprise an array of approximately M pixels 903, e.g., an approximately $M_1 \times M_2$ matrix, where $M=M_1 \cdot M_2$, where the total number of pixels 903 (approximately M) defines the maximum resolution of the sensor array 851, and thus of the sensor module 801. It will be appreciated that each pixel 903 is an electronic circuit, and thus pixels 903 may also be referred to herein as pixel circuits 903. FIG. 10A shows an exemplary pixel 903. As understood by those skilled in the art, a pixel 903 must be pre-charged before it can detect light. Once pre-charged, the pixel 903 detects any input light. The detected light is output when the pixel 903 is driven. Thus, each pixel 903 of the sensor array 901 is controlled by a RESET signal, which selectively connects the pixel 903 to a voltage level, $V_{RST}$, to pre-charge the pixel to enable the pixel to capture light; and a separate DRIVE signal, which selectively connects the pixel 903 to a voltage level, $V_{DD}$, to drive the pre-charged pixel 903 to enable the pixel 903 to output the detected light.

Figure 10B:
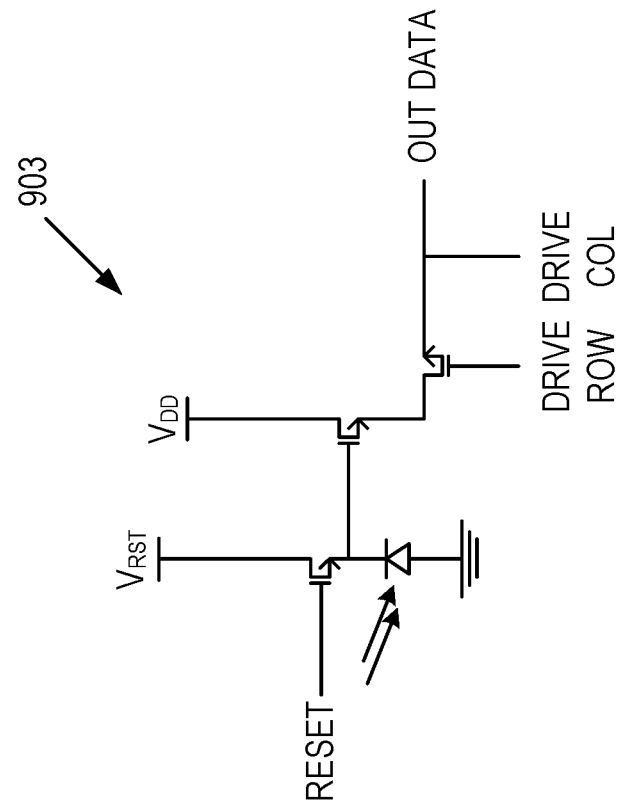
FIG. 10B shows an exemplary pixel in further detail.
Figure 10A:
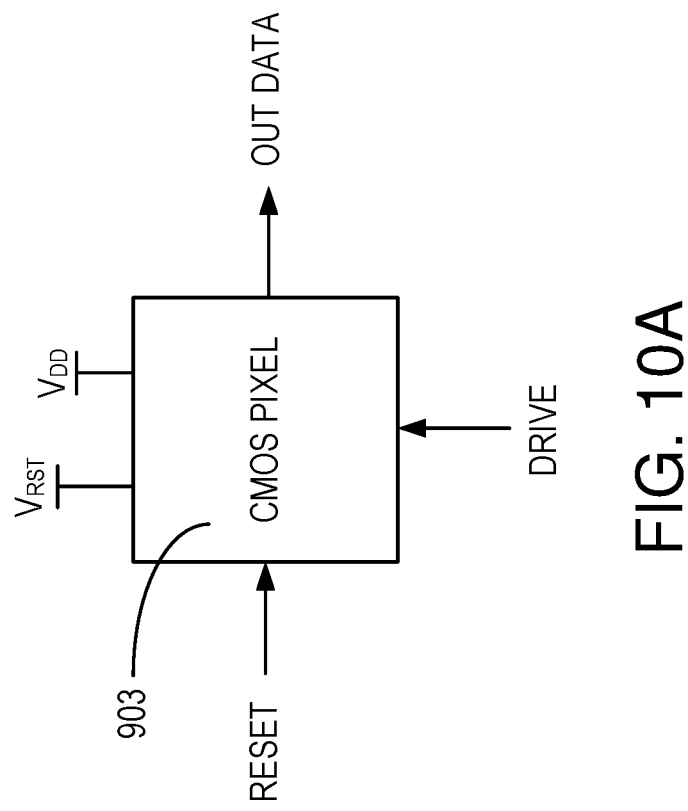
FIG. 10A shows an exemplary pixel.

FIG. 10B shows a more detailed example of an exemplary pixel 903 comprising multiple transistors and a diode. It will be appreciated that implementations other than the one shown in FIG. 10B may be used for the pixel 903 of FIG. 10A. Exemplary pixels include, but are not limited to, Front Side Illuminated (FSI) pixels and Backs Side Illuminated (BSI) pixels. It will be appreciated that the structure of BSI pixels enables wiring to be added without impacting the aperture ratio of the pixel, and thus enables implementation of the solution presented herein without reducing the aperture ratio of the pixel.

The dynamically configurable array of CMOS sensor pixels 903 provides a mechanism for controlling the analog domain power consumption of the system by controlling how many and which pixels 903 are pre-charged. As such, the solution reduces the power consumption of the sensor array 901 by an amount proportional to the uncharged pixels 903. For example, if only half of the pixels 903 are pre-charged, the analog power consumption is reduced by approximately 50%. It will be appreciated that only those pixels that are pre-charged are driven. As such, in some embodiments, the pre-charging and driving aspects of the pixels 903 may be coordinated, e.g., by the control unit 853 and/or by any charge control/drive circuits.

Figure 10C:
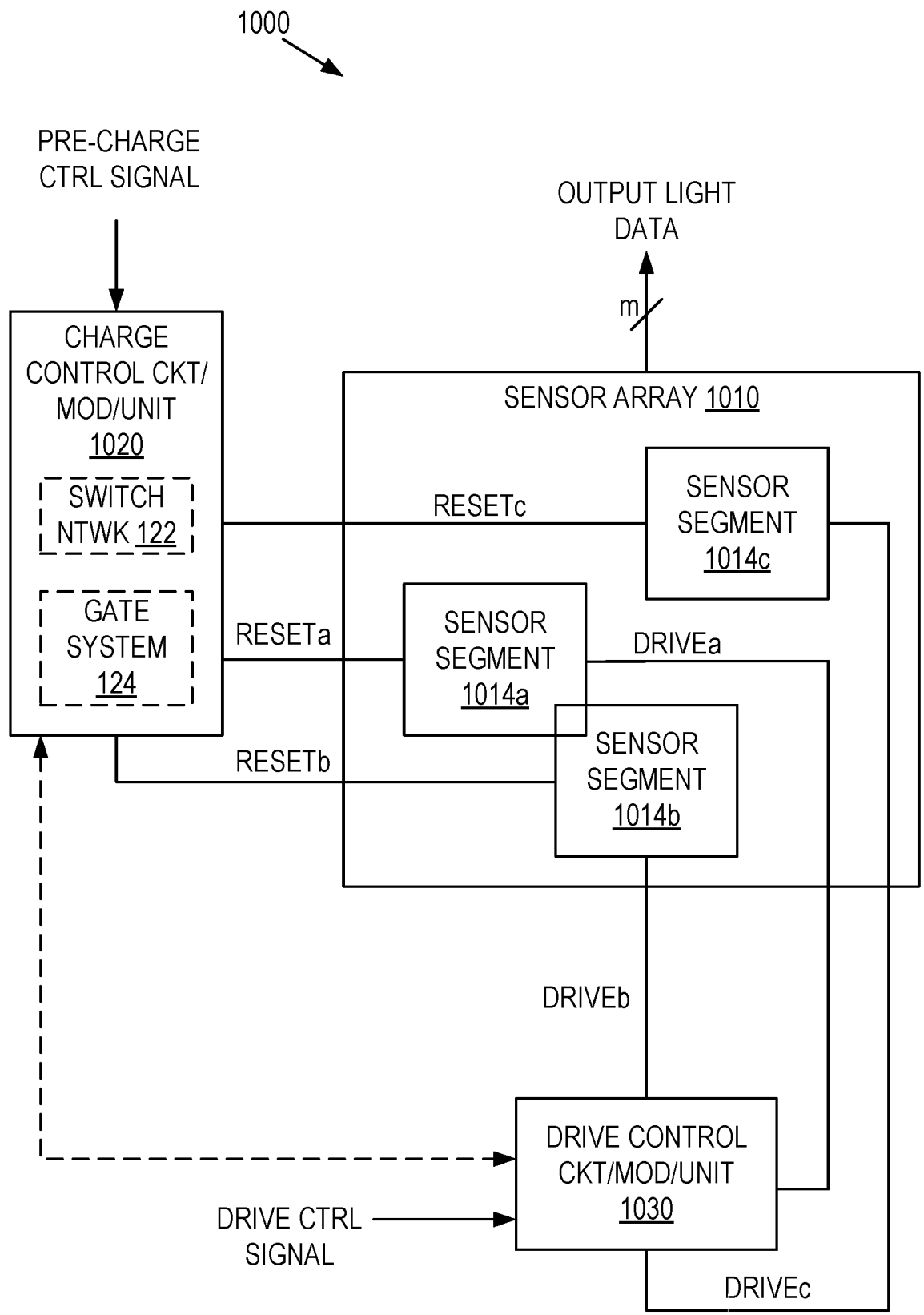
FIG. 10C shows a block diagram of an exemplary sensor array.

FIG. 10C shows a block diagram of an exemplary sensor array 1000. Image sensor array 1000 comprises a sensor array 1010 comprising a plurality of CMOS sensor pixels 903 (the DVS sensor pixels 905 (which are also present as discussed above) are ignored for purposes of this discussion), a charge control circuit 1020, and a drive control circuit 1030. The sensor array 1010 comprises two or more sensor segments 1014, where each of the two or more sensor segments 1014 comprises a different set of pixel(s) 903. While sensor array 1010 is shown as a two-dimensional matrix of pixels 903, it will be appreciated that the sensor array 1010 may alternatively comprise a vector of pixels 903, where the vector of pixels 903 comprises two or more sensor segments 1014. The charge control circuit 1020 is configured to pre-charge pixels 1012 via RESET control lines, while the drive control circuit 1030 is configured to drive pre-charged pixels 1012 via DRIVE control lines. While FIG. 10 shows separate RESET and DRIVE control lines for each of three sensor segments 1014a-c, it will be appreciated that each segment-specific RESET and/or DRIVE control line may represent individual RESET and DRIVE control lines for each pixel 903 in the corresponding segment 1014, or may represent a common RESET and/or DRIVE control line specific to the corresponding segment 1014. Further, it will be appreciated that the solution presented herein does not require three sensor segments 1014a-c as shown in FIG. 10C; sensor array 1010 may comprise fewer or additional sensor segments 1014 than those shown.

In another aspect of exemplary embodiments, the sensor is able to cope with different environmental illumination levels and shifts by adjusting the white balance and exposure level based on a rolling average of the pixels 903 that are scanned during the low power mode. The white balance and exposure levels are fed back to the control unit 853 which responds by adjusting the trigger levels by amounts that depend on the measured environment illumination.

In another aspect of some but not necessarily all exemplary embodiments, the sensor readout can be configured to operate in any of a number of different modes, each associated with a correspondingly different pattern. This enables easy and power efficient readout from the pixels 903. In the different modes, the output from pixels 903 in the selected area are averaged in the analog domain before being sent to an A/D converter, a comparator and a pattern recognizer (all discussed further below).

Figure 11:
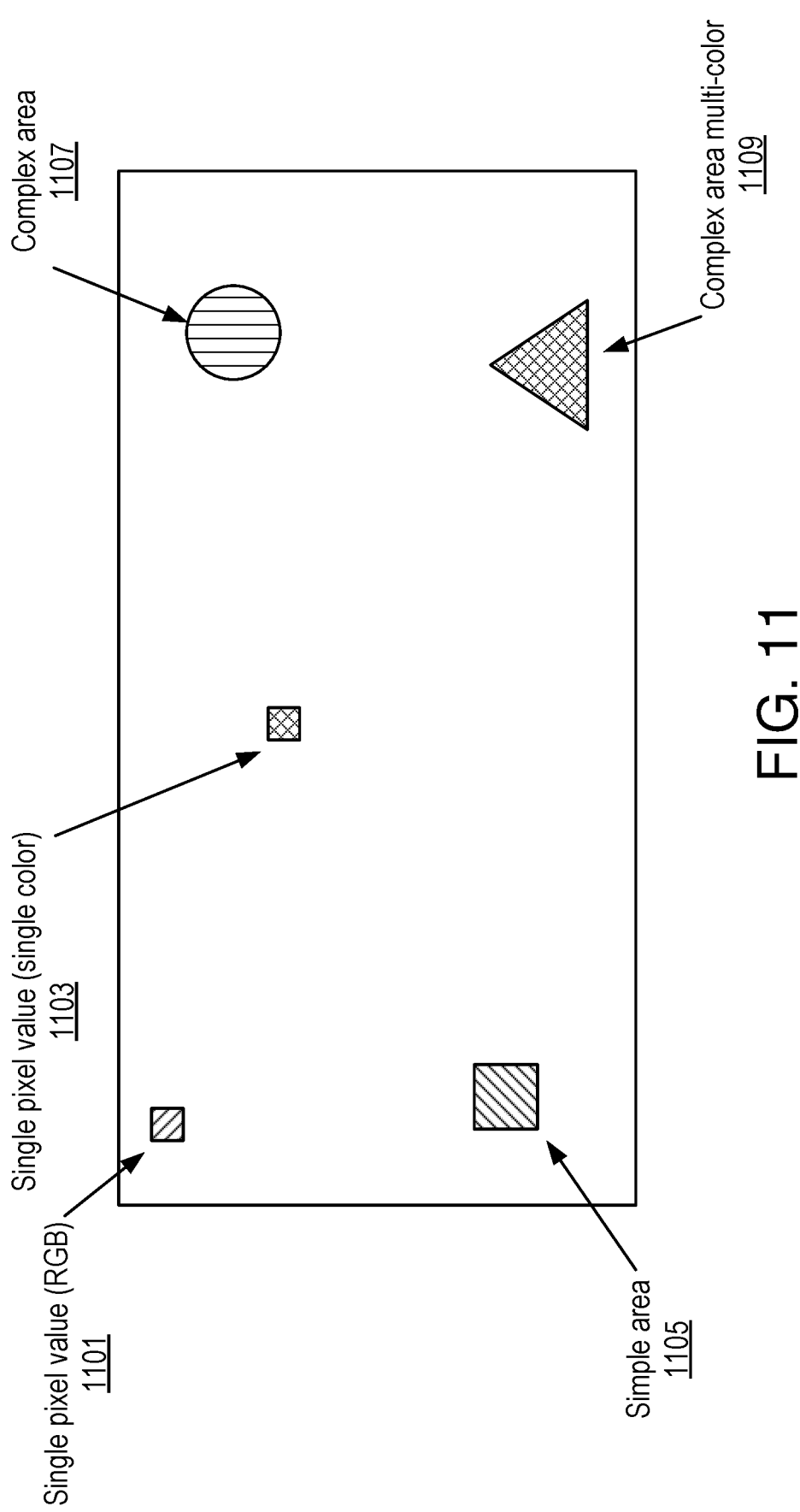
FIG. 11 illustrates a number of exemplary pixel readout modes.

FIG. 11 illustrates a number of exemplary pixel readout modes. It will be appreciated that other modes, not illustrated, are also possible. The illustrated modes are:

- A single pixel RGB mode 1101 (i.e., a single value representing the combined values of the three primary colors).
- A single pixel, single color mode 1103.
- A simple area mode 1105. Simple areas are, for example, squares and rectangles—shapes that are easily binned together in a sensor design. Variants of the simple area include single color and multi-color modes, as in the single pixel mode above. Simple areas can easily be adjusted in the camera readout.
- A complex area mode, either single color 1107 or multi-color 1109. Complex areas are areas that are not easily binned together on the sensor level and include circles and polygons. The complex binning areas need to be decided on at the time of sensor design. To be able to readout a complex area more than one readout might be necessary.

All modes are designed in the sensor and cannot be changed after the design is completed (i.e., at the point that the design will not change anymore). For example, a sensor that is intended to support binning of triangles and rectangles needs to be designed that way.

Figure 12:
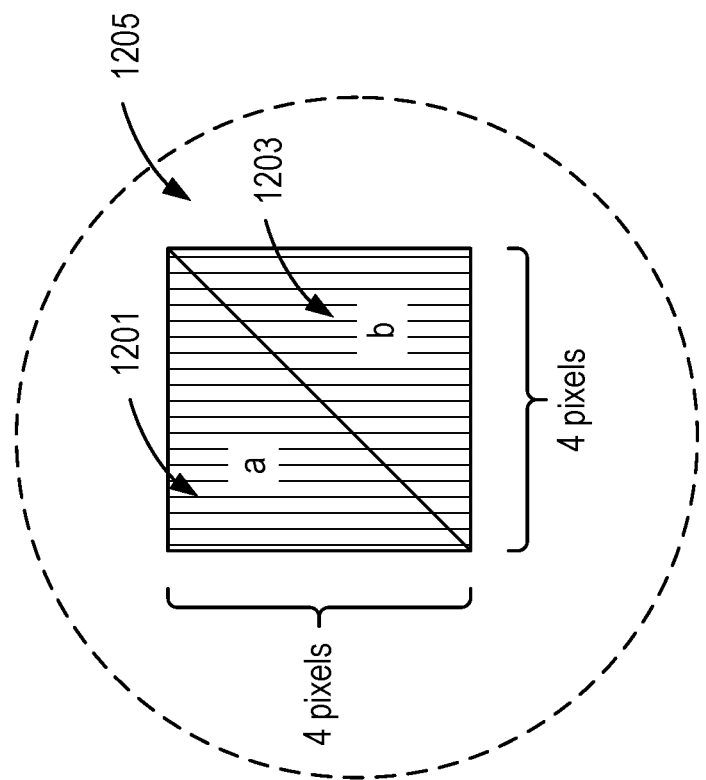
FIG. 12 depicts an example of how a binning can be performed and support different shapes.

FIG. 12 depicts an example of how a binning can be performed and support different shapes. A 4×4 pixel array is shown to illustrate the point, but embodiments consistent with the invention are not limited to this particular arrangement. Three different binning options are supported in this example: a top triangle portion "a" 1201; a bottom triangle portion "b" 1203; and a square 1205 formed by combining the top and bottom triangle portions 1201, 1203. To support more complex shapes more readouts have to be done and matched in the pattern recognizer.

Optical sensors, such as the CMOS sensor pixels 903, produce an analog signal whose magnitude is in proportion to the detected luminosity of the sensed light. One or more analog-to-digital (A/D) converters are used to convert the analog signal from the CMOS sensor pixels 903 into digital signals that can be supplied to digital processing circuitry for the purpose of image analysis. As mentioned earlier, higher levels of analysis are performed by a host system 803.

But in another aspect of embodiments consistent with the invention, the sensor module 801 also includes analog circuitry capable of making a coarse decision about whether an image is recognized or not while consuming very low amounts of energy. An exemplary embodiment of such circuitry is illustrated in FIG. 13.

The circuitry 1300 can be conceptually divided into two parts: an A/D converter that is used in an image sensor system such as is found in the host system 803; and additional, simple circuitry for performing the low power object identification step. Some but not necessarily all embodiments consistent with the invention utilize a single A/D converter for both purposes; some but not necessarily all other embodiments use separate circuitry for these two different functions. All such embodiments are contemplated to be within the scope of the invention.

Figure 13:
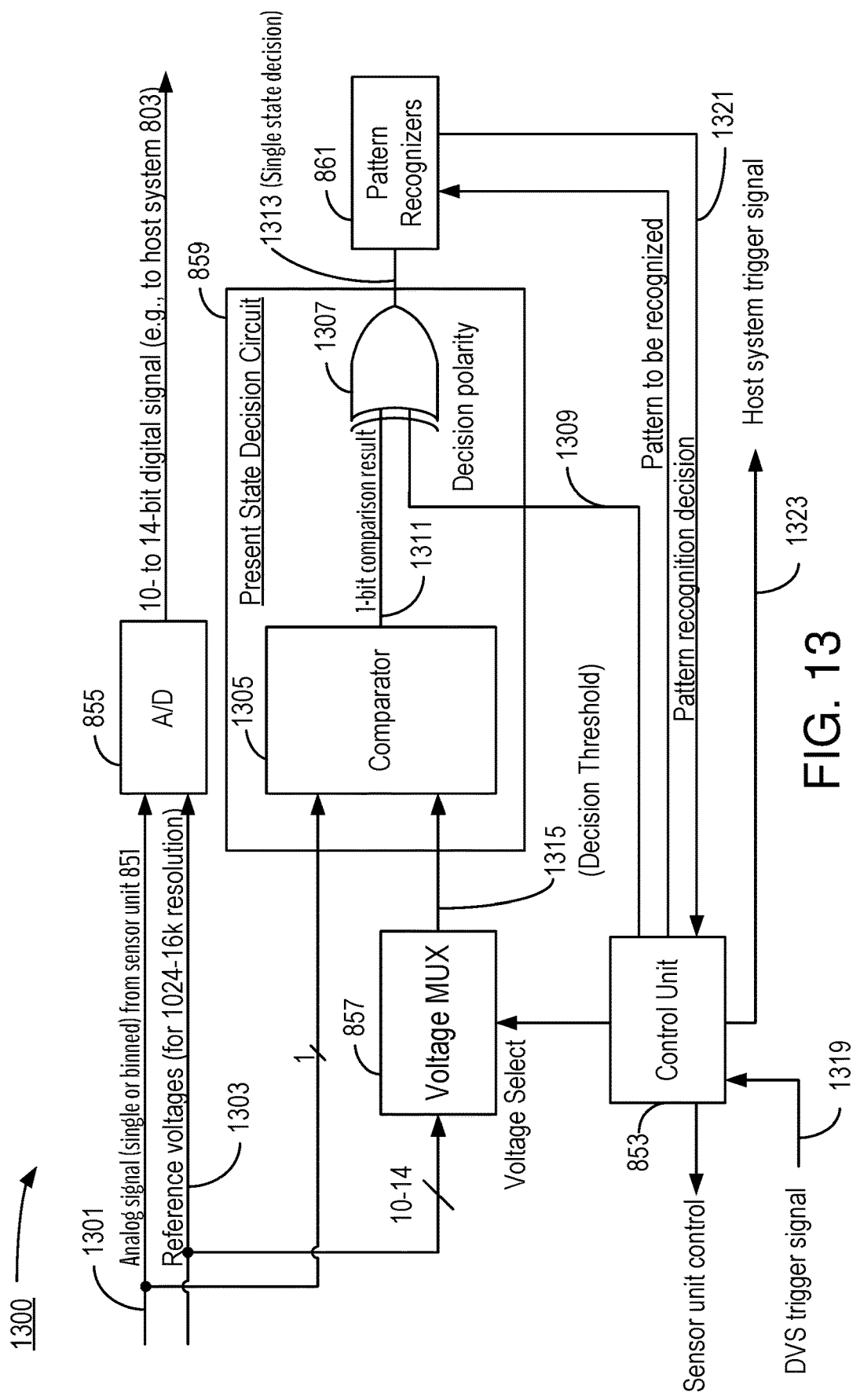
FIG. 13 is a block diagram of an exemplary embodiment of a sensor module.

The example shown in FIG. 13 employs a full multi-bit A/D converter 855 whose multi-bit digital output signal enables image analysis requiring higher levels of image resolution (e.g., some number, X, bits). The digital output of the X-bit A/D converter 855 can be provided to the host system 803 as shown in FIG. 8. The X-bit A/D converter 855 receives an analog signal 1301 from the sensor array 901, and also receives reference voltages 1303 against which the analog signal 1301 is compared, as is known in the art of analog-to-digital signal conversion.

The additional, simple circuitry for performing the low power object identification step in this exemplary embodiment includes a voltage multiplexor 857, a present state decision circuit 859, and pattern recognition circuitry (e.g., a state machine) 861.

The present state decision circuit 859 can, in its simplest form, be a 1-bit comparator 1305 that compares the received analog signal 1301 from the sensor array 851 with a reference voltage set to an object-dependent decision threshold 1315 to produce a 1-bit comparison result signal 1311 having either a binary 0 or 1 value, depending on the results of the comparison. Production of a positive comparison result by the comparator 1305 is taken as an indication that an object in front of the CMOS sensor pixel 903 array may have been recognized.

In an aspect of some embodiments, the decision threshold 1315 is selected from one of the reference voltages 1303 that are already available for the high power A/D converter 855. This is not an essential aspect of the technology; to the contrary, a decision threshold voltage can, in other embodiments, be generated from any other source. In the exemplary embodiment of FIG. 13, selection is performed by the voltage (or power) multiplexor 857 having a selection control signal supplied by the control unit 853. The control unit 853 bases selection on whichever object profile is active at any given moment, and in particular bases selection on profile-related values stored in the registers for users/objects 255 and registers for background 257 as shown in FIG. 8. In some embodiments, the voltage multiplexor 857 is capable of supporting all voltages from the high power A/D converter; in other embodiments, only a subset of the available voltages.

The exemplary comparator 1305 asserts the comparison result signal 1311 (e.g., from low to high) when a positive comparison is made between the received analog signal 1301 and the object-dependent decision threshold 1315 but in some instances, it may be desirable in the low-power mode to detect when an analog signal 1301 is not greater than or equal to a reference voltage (i.e., to detect transitions from high to low instead of from low to high), and for this purpose in some but not necessarily all embodiments the circuitry 1300 is further equipped with logic circuitry, such as an Exclusive OR (XOR) gate 1307, that performs a logical Exclusive OR between the 1-bit comparison result signal 1311 from the comparator 1305 and a decision polarity signal 1309 generated by the control unit 853. When the decision polarity signal 1309 is low, the 1-bit digital comparison result signal 1311 passes through unchanged; when the decision polarity signal 1309 is high, the 1-bit digital comparison result signal 1311 passes through in an inverted form. The output of the XOR gate 1307 is herein denoted single state decision signal 1313.

To save as much energy as possible, the above-described elements need not be activated when operation is in the ultra-low power mode. The control unit 853 therefore receives a DVS trigger signal 1319 that is asserted when the DVS sensor pixels 905 detect a change in luminosity. Assertion of the trigger signal 1319 causes the control unit 853 to transition the unit from ultra-low power mode into the (higher level) low power mode.

In yet another aspect of embodiments consistent with the invention, decision accuracy is improved by detecting different sequences of patterns of pixels rather than occurrence of only a single analog signal 851. In order to be able to detect the different sequences of patterns of pixels, the sensor module 901 includes a state machine or pattern recognizer 861. The pattern recognizer receives the single state decision signal 1313, which represents a comparison decision based on sensor output from any of the above-described sensor operational modes. The pattern recognizer 861 expands the low-power image analysis capability by freeing it from having to make decisions based on only a single, instantaneous sensor output value. Instead, since it is often desirable to make a "recognized"/"not recognized" decision based on whether a known sequence of sensor signals have been produced, the pattern recognizer 861 is configured to detect whether a sequentially occurring pattern of particular decisions has been made. It is noted that assertion of the single state decision signal 1313 can denote detection of different patterns at different times, since the control unit 853 can dynamically control what pattern the sensor unit 851 will be scanning for at any moment, as well as what luminance levels are being looked for (as represented by the selected voltage being fed to the comparator 1305), and the decision polarity 1309. Therefore, an unbroken string of assertions does not mean that the same pattern has been detected over a stretch of time; one assertion can mean for example that a triangle of a particular luminance has been detected, and a next assertion can mean for example that a blue circle has been detected.

Figure 14:
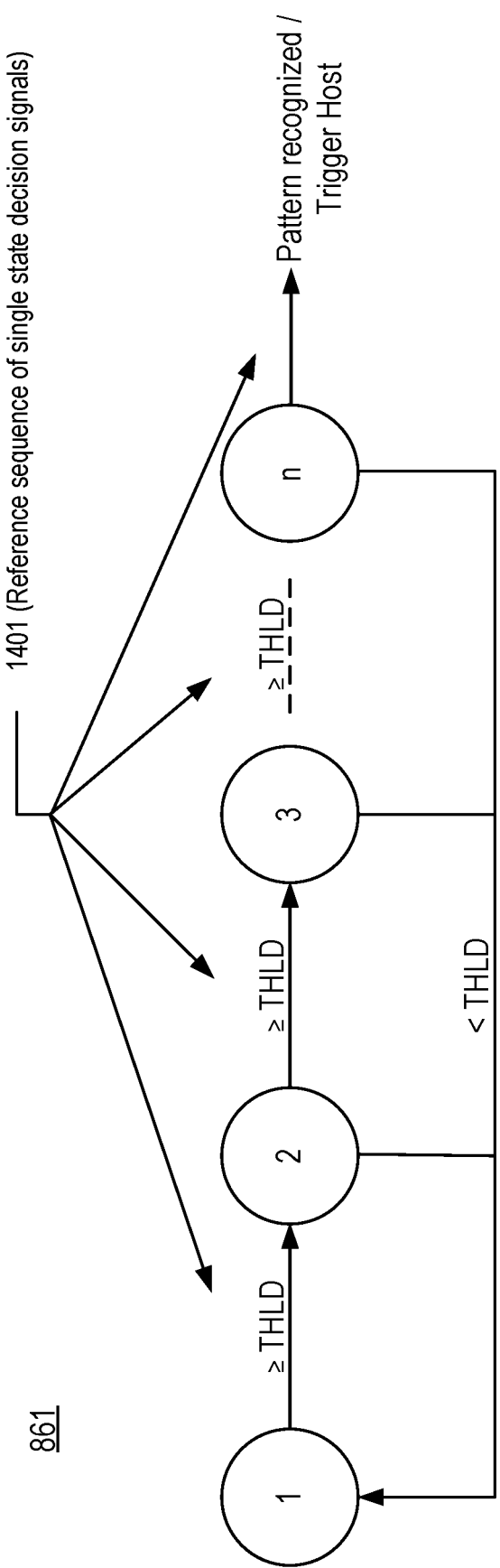
FIG. 14 illustrates a state machine utilized as a pattern recognizer.

As an example, consider a case in which it is desired to trigger a higher-level analysis (e.g., by the host system 803) when a certain number of consecutive image patterns with positive comparison decisions occurs. These triggers could all be based on the same decision threshold 1315, or could alternatively be based on different decision threshold values 1315 depending on what voltage selection signal the control unit 853 supplied to the voltage multiplexor 857 at the time of decision making. FIG. 14 illustrates a state machine 861 for this example. As can be seen in the figure, transitions are made from a first state to a second, then to a third, and so on for some number, n, states, so long as each next transition indicates that a sensor output satisfied a particular threshold value. But if, in any one of the states, a next decision indicates that the sensor output transition did not satisfy a particular threshold value, then the pattern has been broken and the state machine 861 reverts back to its initial, first, state. It can be seen that, in this way, the sequence of single state decision signals 1313 is compared against a reference sequence of single state decision signals 1401.

A pattern recognition decision signal 1321 is, in some embodiments, routed back to the controller 853. In another aspect of embodiments consistent with the invention, the controller 853 is configured to assert a host system trigger signal 1323 when the pattern recognition signal 1321 is asserted. Assertion of the host system trigger signal 1323 can, for example, cause an affiliated host system 803 to become activated and accordingly perform a higher-level of object recognition analysis.

In another aspect of some but not necessarily all embodiments, the controller 853 is configured to increase a number of activated CMOS sensor pixels 903 when the pattern recognition signal 1321 is asserted. This serves to provide a higher resolution image capture in support of the host system's higher-level of object recognition analysis.

The pattern recognizer/state machine 861 can take on any of a number of different forms depending on what the designer would like to use as a trigger scheme. For example, several different state machines could be provided in a design, with the active one being chosen by the control unit 853; the control unit 853 gets state machine selection information from the settings loaded into the register for users/objects 255 and register for background 257.

The system is able to detect a wider range of different complex patterns by having several different pattern recognizers 861. It can also be that several complex patterns need to be recognized before the host is triggered. This is controlled by the control unit 853 that get this information from the register settings for each profile that is present in the system.

Further aspects of embodiments consistent with the invention will now be described with reference to FIGS. 15A and 15B, which in one respect depict a flowchart of actions performed by the system sensor module 801 in accordance with a number of embodiments. In other respects, the blocks depicted in FIGS. 15A and 15B can also be considered to represent means 1500 (e.g., hardwired or programmable circuitry or other processing means) for carrying out the described actions.

Figure 15A:
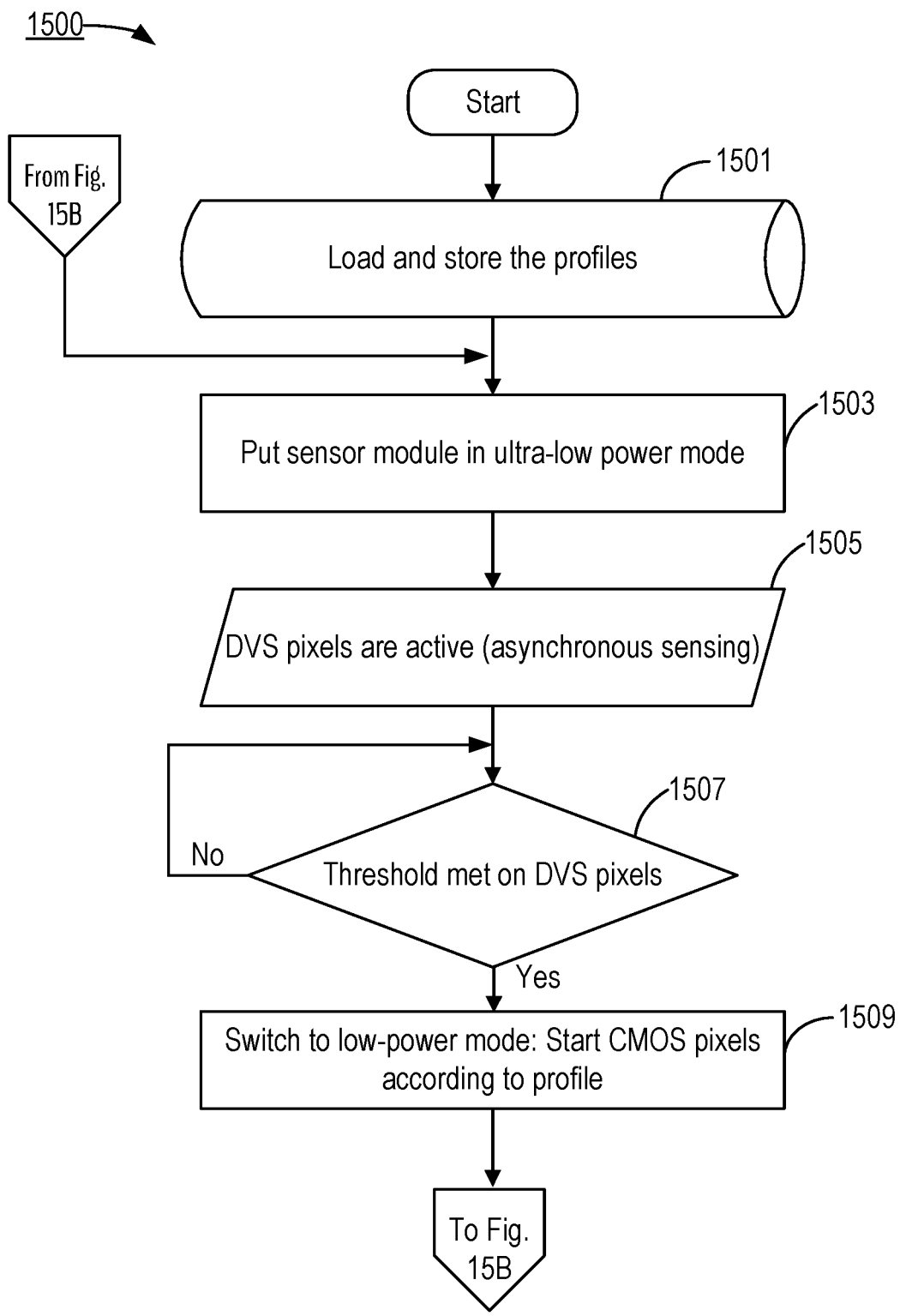
FIGS. 15A and 15B are in combination, in one respect, a flowchart of actions performed by the system sensor module in accordance with a number of embodiments.
Figure 15B:
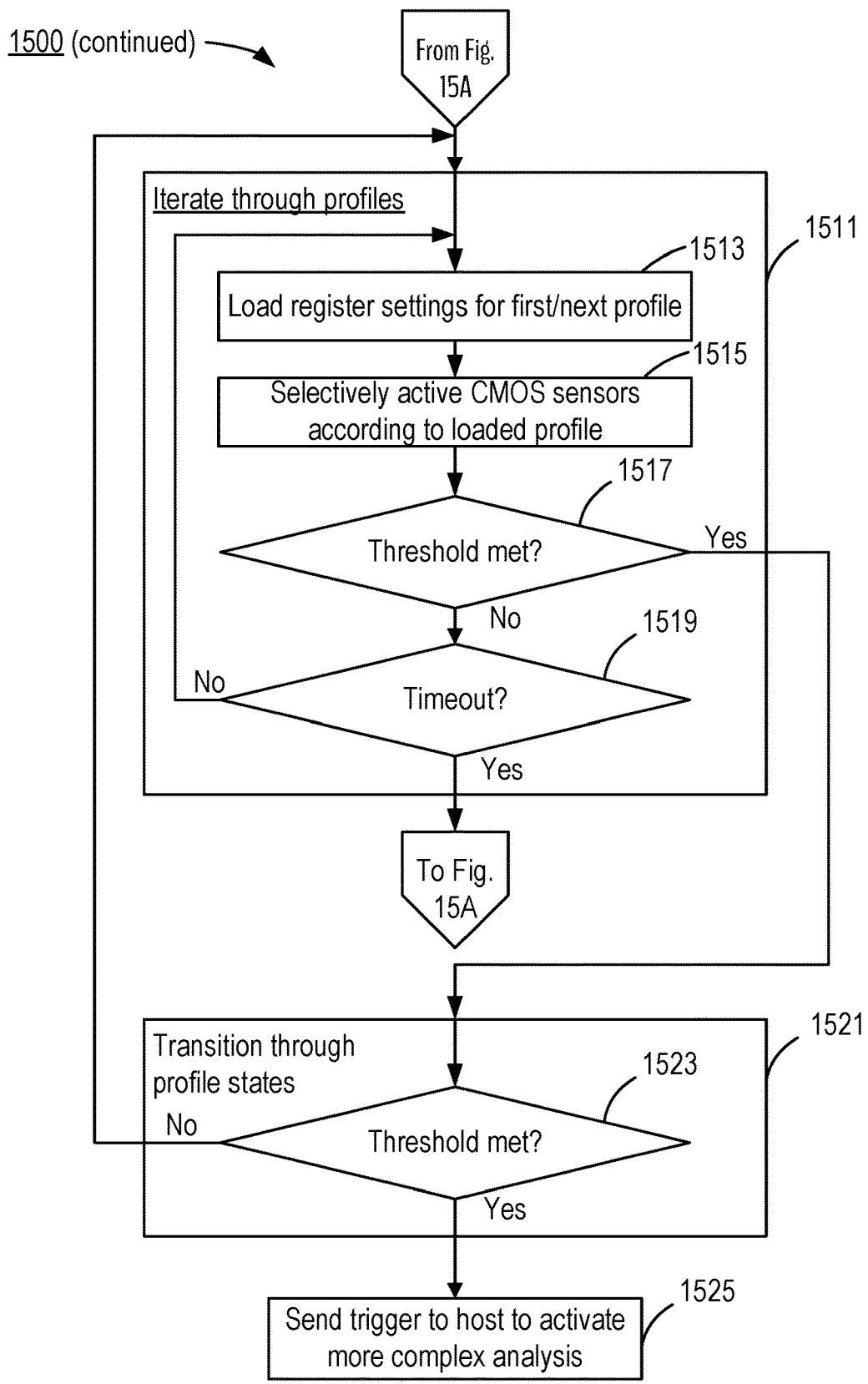

As shown beginning in FIG. 15A, the process includes loading the different object/user/background profiles into the respective register settings of the sensor module 801 (step 1501). These are the user register settings, object register settings, and background register settings produced at, for example, steps 501 and 503 (see FIG. 5). The sensor module 801 is then placed into an ultra-low power mode, in which only the DVS pixels 905 are active (step 1503). As explained earlier, the DVS pixels 905 operate asynchronously, and include circuitry that issues a trigger when an illumination difference is detected according to the DVS pixel setting (step 1505).

The system remains in ultra-low power mode so long as the DVS pixels 905 do not issue a trigger signal 1319 ("No" path out of decision block 1507). When the DVS pixels 905 do trigger ("Yes" path out of decision block 1507), the system transitions to the low power mode in which the CMOS sensor pixels 903 are started (step 1509).

In the low power mode, the system iterates through all of the object/user profiles to see if CMOS sensor outputs match any of them (step 1511). More particularly, register settings are loaded for initially a first and then (if warranted) a next profile (step 1513), and the CMOS sensor pixels 903 are selectively activated according to the loaded register settings (step 1515).

If the threshold specified by the loaded profile settings are not satisfied ("No" path out of decision block 1517), a further test is performed to determine whether a timeout condition has been satisfied (decision block 1519). If it has ("Yes" path out of decision block 1519), processing reverts back to step 1503, where the system is switched back into ultra-low power mode. In some but not necessarily all alternative embodiments, instead of using the described timeout mechanism, a strategy is adopted in which all profiles are checked some predetermined number (one or more) of times and if so, processing reverts back to step 1503.

But if a timeout has not occurred ("No" path out of decision block 1519), processing reverts back to step 1513 where settings from a next profile are loaded into the registers and iteration continues for another round.

If the threshold settings are satisfied for one of the profiles ("Yes" path out of decision block 1517), then processing advances to state machine processing (step 1521) in which a pattern of successively generated output signals from the CMOS sensor pixels 903 are tested against a predefined pattern for the current profile. Each generated CMOS sensor output is tested against a corresponding next predefined state condition (decision block 1523) (see, e.g., FIG. 14). If at any point the threshold condition is not satisfied ("No" path out of decision block 1523), then a match has not been found and processing reverts to step 1511 where iteration through the profiles is taken up again.

But if the state machine processing advances through all of the predefined (profile-dependent) states (e.g., states 1 . . . n as shown in FIG. 14) with the threshold conditions being satisfied each time ("Yes" path out of decision block 1523), then a trigger is generated and sent to the host system 803 (step 1525) so that a higher-resolution analysis can be performed by that unit as described earlier.

Figure 16:
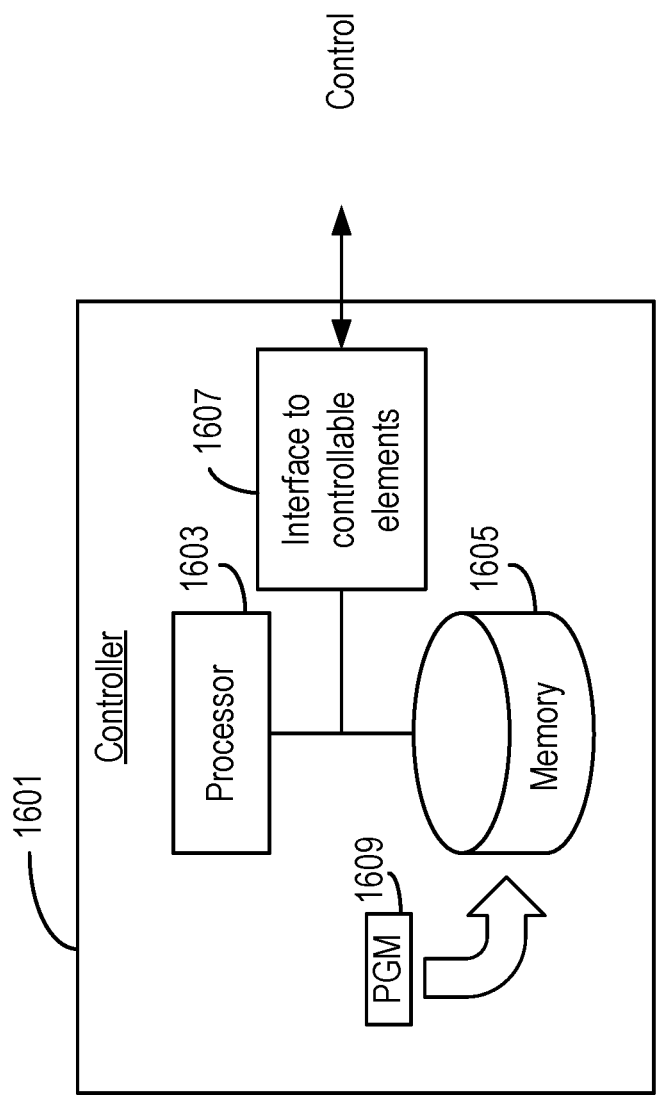
FIG. 16 is a block diagram of an exemplary controller of a system in accordance with some but not necessarily all exemplary embodiments consistent with the invention.

Aspects of an exemplary controller 853 that may be included in the system sensor module 801 to cause any and/or all of the above-described actions to be performed as discussed in the various embodiments are shown in FIG. 16, which illustrates an exemplary controller 1601 of a sensor module 801 in accordance with some but not necessarily all exemplary embodiments consistent with the invention. In particular, the controller 1601 includes circuitry configured to carry out any one or any combination of the various functions described above. Such circuitry could, for example, be entirely hard-wired circuitry (e.g., one or more Application Specific Integrated Circuits—"ASICs"). Depicted in the exemplary embodiment of FIG. 16, however, is programmable circuitry, comprising a processor 1603 coupled to one or more memory devices 1605 (e.g., Random Access Memory, Magnetic Disc Drives, Optical Disk Drives, Read Only Memory, etc.) and to an interface 1607 that enables bidirectional communication with other elements of the sensor module 801. The memory device(s) 1605 store program means 1609 (e.g., a set of processor instructions) configured to cause the processor 1603 to control other system elements so as to carry out any of the aspects described above. The memory device(s) 1605 may also store data (not shown) representing various constant and variable parameters as may be needed by the processor 1603 and/or as may be generated when carrying out its functions such as those specified by the program means 1609.

Various embodiments consistent with the invention provide an advantage over conventional technology in that a first level of object detection can be done at extremely low power consumption enabling the use in always-on battery-operated devices.

Aspects relating to the use of DVS sensor pixels 905 especially enable always-on operation, since the next higher level of processing (at a higher level of power consumption) is invoked only when actually needed.

In another advantage, the use of analog circuitry and selective activation of CMOS sensor pixels 903 to perform a low-level of image analysis in turn ensures that higher levels of processing power are not invoked unless they are actually needed.

Embodiments consistent with the invention may be deployed in a number of different kinds of devices. For example, low power, always-on sensor technology can advantageously be used in any number of battery-powered devices, such as mobile communication devices (e.g., User Equipment—"UE"). It is also well-suited for use in low-power devices such as Internet-of-Things (IoT) devices. Such devices may themselves be sensor devices for sensing and reporting other aspects of an environment (e.g., temperature, movement, etc.).

The invention has been described with reference to particular embodiments. However, it will be readily apparent to those skilled in the art that it is possible to embody the invention in specific forms other than those of the embodiment described above. Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

The invention claimed is:

1. An optical sensor module comprising:
a controller;
a sensor array comprising a plurality of CMOS sensor pixels, wherein the sensor array is configured to supply one of a plurality of analog sensor signals at each of a sequence of sample times, wherein at each of the sample times, the one of the plurality of analog sensor signals is derived from one or more of the plurality of CMOS sensor pixels;
present state decision circuitry configured to compare the one of the plurality of analog sensor signals for each of the sequence of sample times with a respective controller-selected reference voltage and to generate therefrom a respective single state decision signal; and
a pattern recognizer configured to assert a pattern recognition signal whenever a plurality of sequentially generated single state decision signals matches a currently active one of a set of one or more reference sequences of single state decision signals,
wherein the controller is configured to assert a host system trigger signal when the pattern recognition signal is asserted a predefined number of times in sequence.

2. The optical sensor module of claim 1, wherein at least one of said one of the plurality of analog sensor signals is an analog sensor signal representing an output from a single one of the plurality of CMOS sensor pixels.

3. The optical sensor module of claim 1, wherein at least one of said one of the plurality of analog sensor signals is a binned analog sensor signal produced by two or more of the plurality of CMOS sensor pixels.

4. The optical sensor module of claim 1, wherein:
the set of one or more reference sequences includes at least two reference sequences of single decision signals;
a first one of the set of one or more reference sequences differs from a second one of the set of one or more reference sequences;
a first assertion of the pattern recognition signal occurs at a first time whenever the plurality of sequentially generated single state decision signals matches the first one of the set of one or more reference sequences;
a second assertion of the pattern recognition signal occurs at a sequentially second time whenever the plurality of sequentially generated single state decision signals matches the second one of the set of one or more reference sequences; and
the controller is configured to assert the host system trigger signal whenever the pattern recognition signal is asserted at both the first and second times.

5. The optical sensor module of claim 1, further comprising:
a voltage multiplexor that selects the controller-selected reference voltage from a plurality of reference voltages, wherein the controller is configured to select the controller-selected reference voltage based on profile information stored in a register.

6. The optical sensor module of claim 1, wherein the optical sensor module further comprises one or more Dynamic Vision Sensor, DVS, sensor pixels that collectively assert a DVS trigger signal when luminance detected by at least one of the one or more DVS sensor pixels changes by a threshold amount.

7. The optical sensor module of claim 6, wherein the controller is configured to:
operate the optical sensor module in an ultra-low power mode in which all of the CMOS sensor pixels are deactivated and only the one or more DVS sensor pixels are active; and
transition the optical sensor module to operate in a low power mode in response to the DVS trigger signal being asserted,
wherein at least one of the CMOS sensor pixels is activated when the optical sensor module operates in the low power mode.

8. The optical sensor module of claim 7, wherein operation in the low power mode comprises activating at least one but fewer than all of the CMOS sensor pixels.

9. The optical sensor module of claim 1, wherein the controller is configured to increase a number of activated CMOS sensor pixels when the host system trigger signal is asserted.

10. The optical sensor module of claim 1, wherein the present state decision circuitry further comprises circuitry configured to invert a polarity of the single state decision signal.

11. A mobile communication device comprising the optical sensor module of claim 1.

12. A low-power sensor device comprising the optical sensor module of claim 1.

13. A method of operating an optical sensor module that comprises a controller and a sensor array comprising a plurality of CMOS sensor pixels, wherein the sensor array is configured to supply one of a plurality of analog sensor signals at each of a sequence of sample times, wherein at each of the sample times, the one of the plurality of analog sensor signals is derived from one or more of the plurality of CMOS sensor pixels, the method comprising:
comparing the one of the plurality of analog sensor signals for each of the sequence of sample times with a respective controller-selected reference voltage and generating therefrom a respective single state decision signal;
asserting a pattern recognition signal whenever a plurality of sequentially generated single state decision signals matches a currently active one of a set of one or more reference sequences of single state decision signals; and
asserting a host system trigger signal when the pattern recognition signal is asserted a predefined number of times in sequence.

14. The method of claim 13, wherein:
the set of one or more reference sequences includes at least two reference sequences of single decision signals;
a first one of the set of one or more reference sequences differs from a second one of the set of one or more reference sequences;
a first assertion of the pattern recognition signal occurs at a first time whenever the plurality of sequentially generated single state decision signals matches the first one of the set of one or more reference sequences;
a second assertion of the pattern recognition signal occurs at a sequentially second time whenever the plurality of sequentially generated single state decision signals matches the second one of the set of one or more reference sequences; and
the method comprises:
asserting the host system trigger signal whenever the pattern recognition signal is asserted at both the first and second times.

15. The method of claim 13, further comprising:
selecting the controller-selected reference voltage from a plurality of reference voltages,
wherein selecting the controller-selected reference voltage is based on profile information stored in a register.

16. The method of claim 13, wherein the optical sensor module further comprises receiving a DVS trigger signal from one or more Dynamic Vision Sensor, DVS, sensor pixels that collectively assert the DVS trigger signal when luminance detected by at least one of the one or more DVS sensor pixels changes by a threshold amount.

17. The method of claim 16, further comprising:
operating the optical sensor module in an ultra-low power mode in which all of the CMOS sensor pixels are deactivated and only the one or more DVS sensor pixels are active; and
transitioning the optical sensor module to operate in a low power mode in response to the DVS trigger signal being asserted,
wherein at least one of the CMOS sensor pixels is activated when the optical sensor module operates in the low power mode.

18. The method of claim 17, wherein operation in the low power mode comprises activating at least one but fewer than all of the CMOS sensor pixels.

19. The method of claim 13, further comprising:
increasing a number of activated CMOS sensor pixels when the host system trigger signal is asserted.

20. The method of claim 13, further comprising inverting a polarity of the single state decision signal.

* * * * *